United States Patent [19]

Buchmayer

[11] Patent Number: 5,090,272

[45] Date of Patent: Feb. 25, 1992

[54] HAND HELD COMPRESSED AIR POWERED INSULATED WIRE STRIPPER

[76] Inventor: Ernst Buchmayer, 117 129th N.E. Ave., Bellevue, Wash. 98005

[21] Appl. No.: 545,413

[22] Filed: Jun. 27, 1990

[51] Int. Cl.⁵ .............................................. H02G 1/12
[52] U.S. Cl. ...................................... 81/9.41; 81/9.43
[58] Field of Search ................... 81/9.41, 9.42, 9.43, 81/9.44, 9.51

[56] References Cited

U.S. PATENT DOCUMENTS

| | | | |
|---|---|---|---|
| 3,765,277 | 10/1973 | Sorensen | 81/9.43 |
| 4,072,069 | 2/1978 | Bieganski | 81/9.43 |
| 4,638,692 | 1/1987 | Bensussen et al. | 81/9.41 |

Primary Examiner—D. S. Meislin
Attorney, Agent, or Firm—Roy E. Mattern, Jr.

[57] ABSTRACT

A hand held insulated wire stripper uses compressed air power, instantaneously, to grip an insulated wire and to cut the insulation thereof. Thereafter, the insulation is stripped from the wire and ejected. The forces created by the compressed air power originate horizontally and then via cam surfaces and levers are redirected vertically to close gripper and cutter subassemblies. Upon release of the compressed air power, the forces of springs return the components to their starting positions. An insulated wire is inserted, then the compressed air power is turned on, and while it is on the gripping, cutting, stripping, ejecting, and withdrawal of the stripped wire is all undertaken.

17 Claims, 14 Drawing Sheets

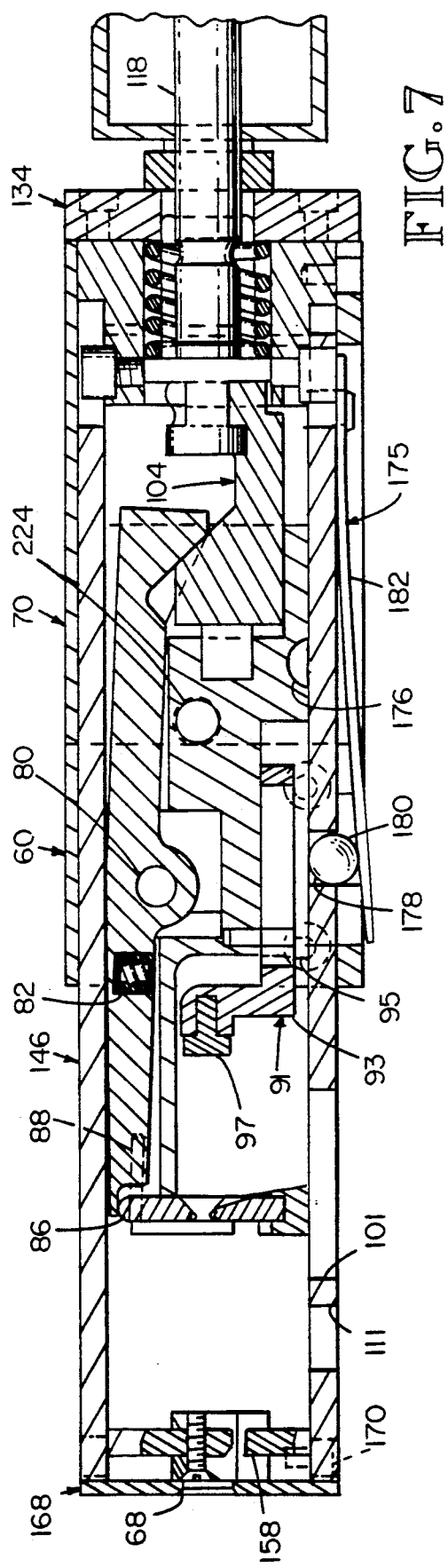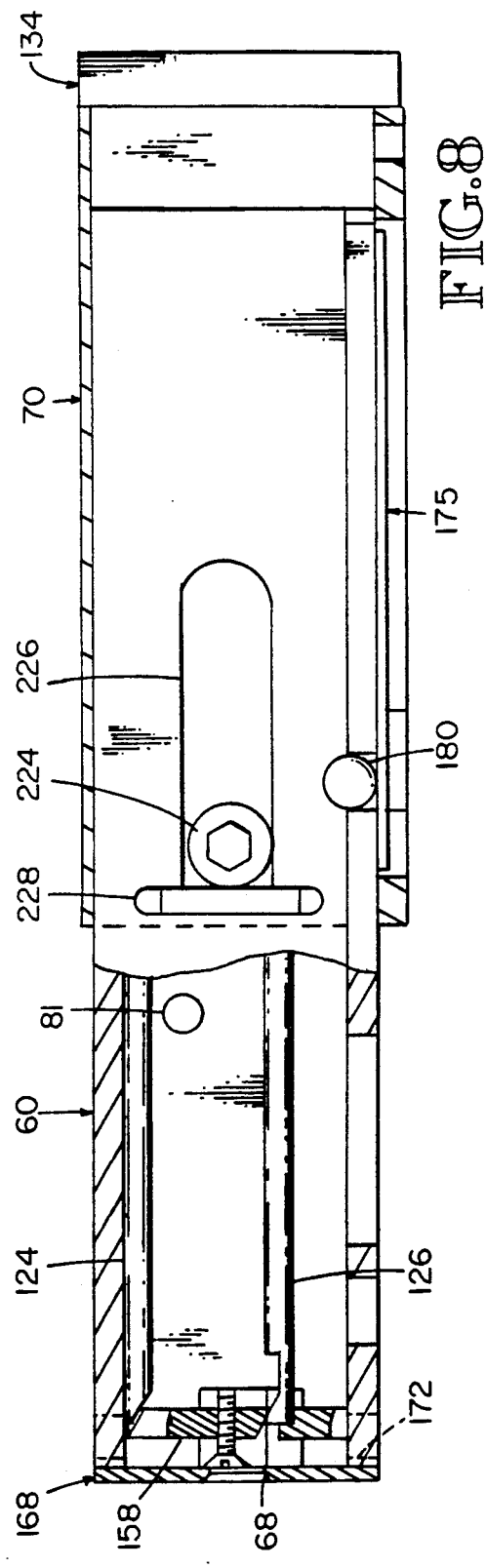

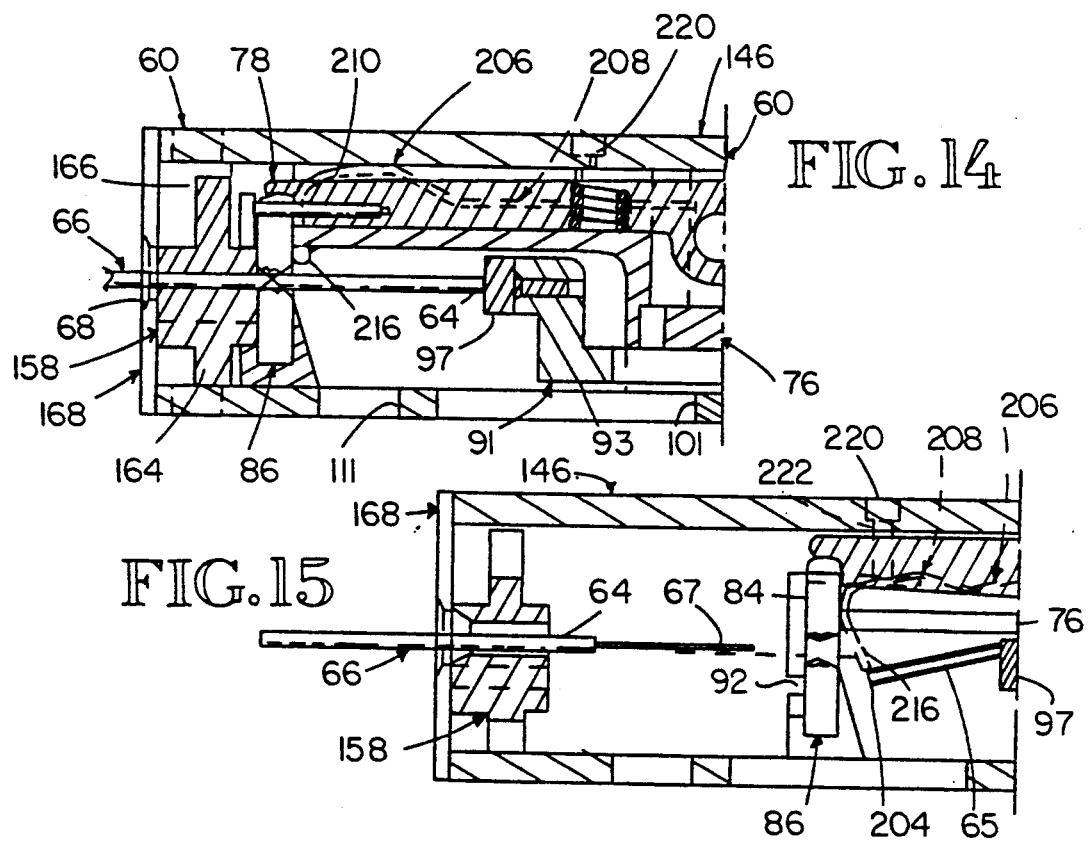
FIG. 14
FIG. 15
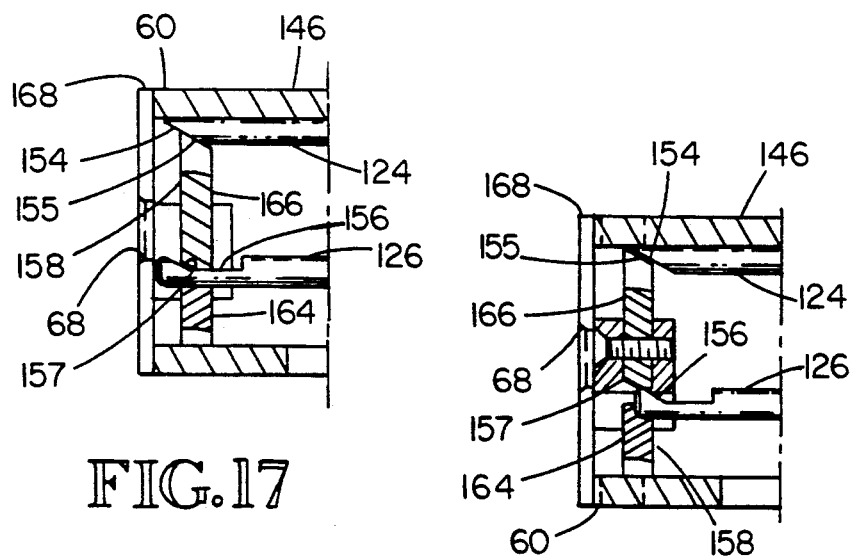
FIG. 17
FIG. 16

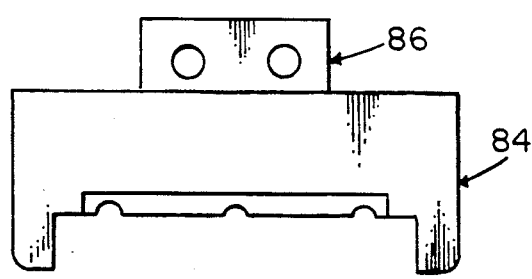
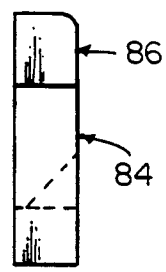
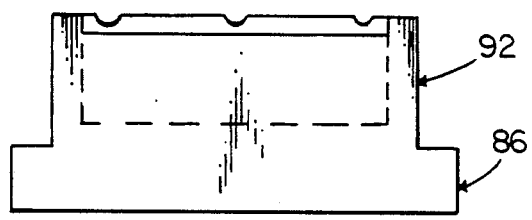
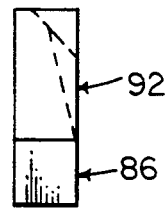
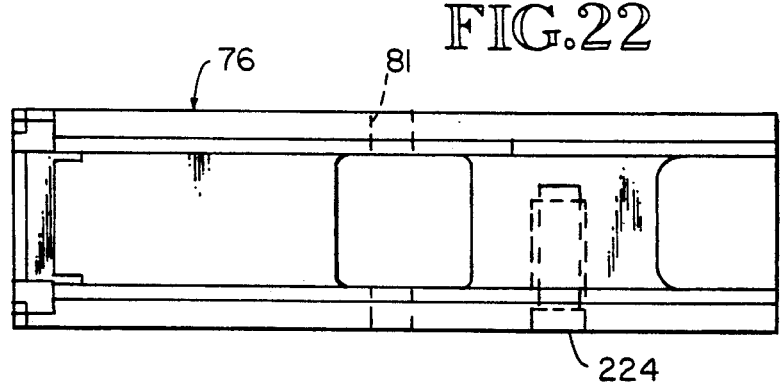
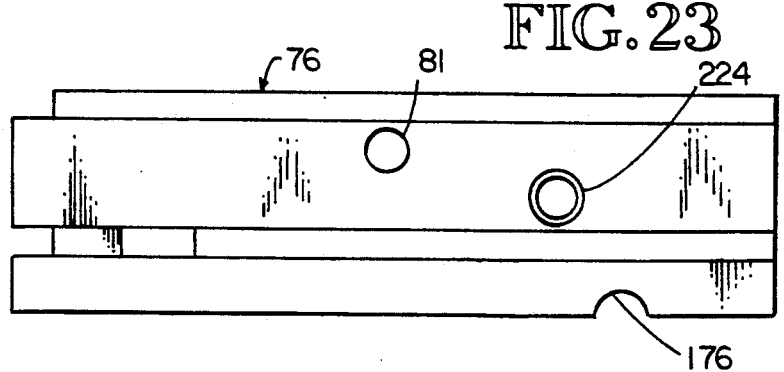

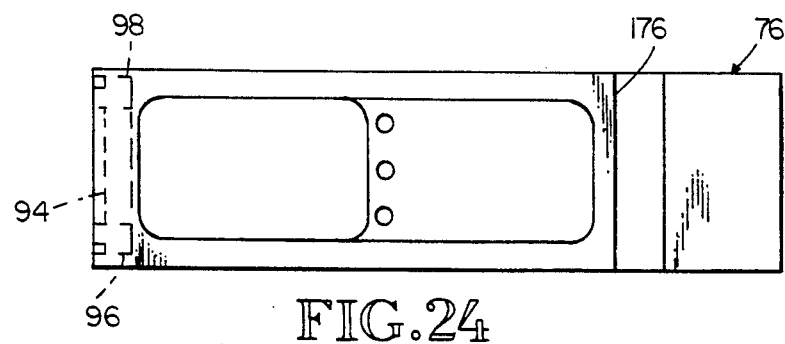
FIG. 24
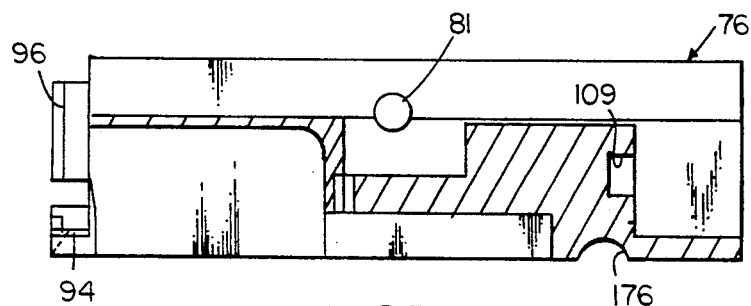
FIG. 25
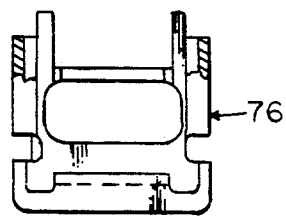
FIG. 26
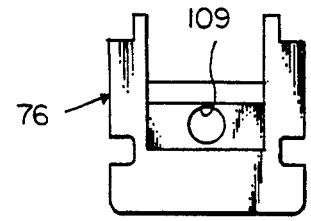
FIG. 27
FIG. 28
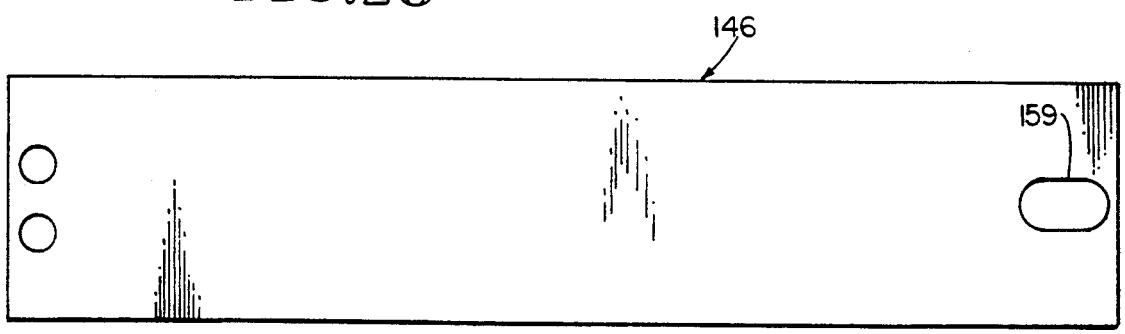

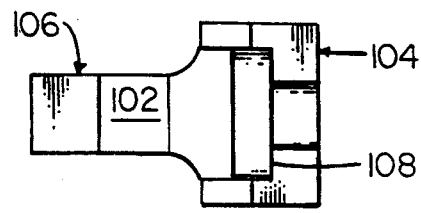
FIG.46
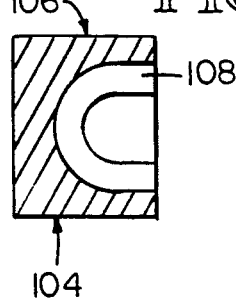
FIG.48
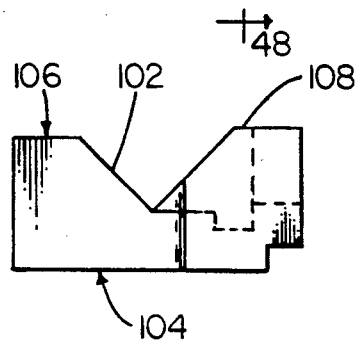
FIG.47
FIG.49
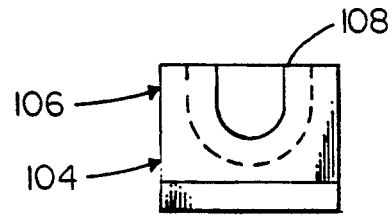
FIG.50
FIG.53
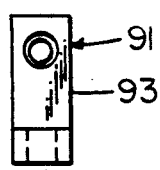
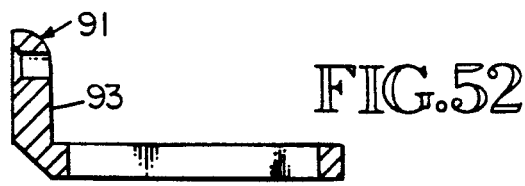
FIG.52
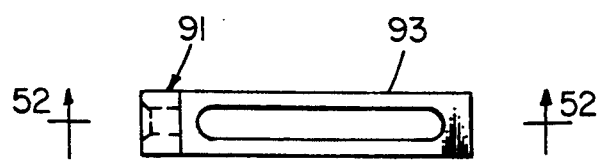
FIG.51

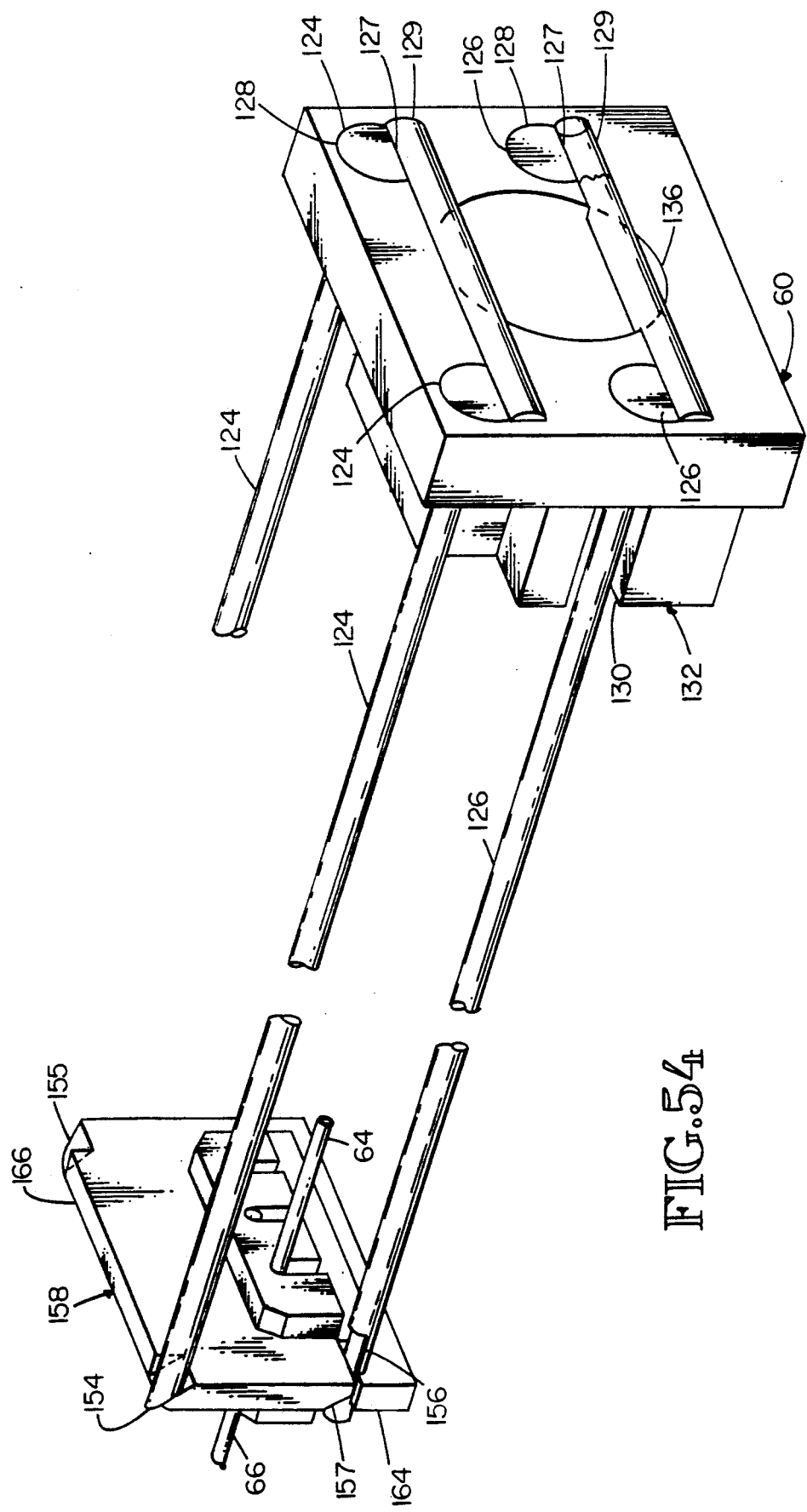

HAND HELD COMPRESSED AIR POWERED INSULATED WIRE STRIPPER

Ends of insulated wires are stripped of insulation to prepare them for subsequent installations by using a hand held compressed air powered insulated wire stripper, requiring the finger manipulation of an air valve, by using the holding hand of the operator, and finger manipulations of a wire to be stripped, by using his or her other hand. An insulated wire end is inserted into designated wire size entry and advanced into contact with an adjustably pre-positioned stop. When this insulated wire stripper is at rest and also during this insulated wire entry period, a compression coiled spring of the wire stripper, via several components, keeps an insulated wire gripper open and an insulation cutter open, permitting the insulated wire end to reach the stop. When the air valve is opened, a piston of an air cylinder actuator is moved against the force of another compression coil spring within this actuator. A piston rod extending out from this actuator, initially extends through the compression coil spring of the insulated wire stripper. It is flexibly coupled, via a coupler and cams, to an inner slide of the wire stripper. This coupler includes a flange to abut one end of the compression spring. The other end of this compression spring abuts a back plate of this insulated wire stripper. This compression spring tries to keep the inner slide forward, and this spring force thereof is progressively offset when the compressed air actuator is operated. Under air pressure, when the inner slide is moved rearwardly, the gripper, positioned by gripper cam pins, and the cutter, positioned in the inner slide, are operated. During relative motion, the gripper is closed as the gripper cam surfaces thereof interact with cam surfaces on an elongated pair of gripper closing cam pins, in turn indirectly secured to the back plate by using a gripper cam pins holding block. During this same relative motion of the gripper and the gripper closing cam pins, a pair of gripper opening cam pins, also in turn indirectly secured to the back plate, by using a gripper cam pins holding block, have cam surfaces which allow the gripper to move into contact with the insulated wire. When the insulated wire is well gripped, the insulation cutter is actuated, essentially instantaneously, as a pivotal, spring returned, lever insulation cutter actuator, which has the front end thereof pin connected to a movable upper cutter portion, is tilted downwardly. A cam at the rear of this lever interacts with a lower positioned cam of the coupler, which via these cams and the lever, couples the slide to the extending piston rod of the air cylinder. During this early retracting movement of this inner slide and the inner housing together, the insulated wire inserted into this insulated wire stripper has been very well gripped and then the insulation has been cut. The inner slide during this early retracting movement is releasibly held in a definite position relative to a surrounding inner housing. When initially held together, the inner slide and inner housing move together a short distance, until the gripper and cutter are both firmly bearing respectively against the insulated wire and the wire. These firmly bearing positions of the gripper and cutter are reached before a disassembly limit structure could ever become effective. This disassembly limit structure, includes a limit structure surrounding a slot in the inner housing, which contacts a projecting stop screw, which is threadably anchored in a cam pins holding block, which after receiving the four gripper cam pins is secured to the back plate. Preferably there is a dual set of this slot and this stop screw. As the compressed air pressure continues to build up, as the gripper and cutter are firmly bearing respectively against the insulated wire and the wire, a pulling force is reached causing the release of the inner slide from the inner housing. This release occurs as the force of a leaf spring, secured to the inner housing, is overcome, allowing the clearance of a transverse control pin from a transverse control pin receiving groove in the inner slide, with the control pin being moved into a transverse receiving opening in the inner housing. The inner slide is then independently retracted farther by the retraction of the initially extending piston of the compressed air actuator, subject to the limits of the advancing piston within a cylinder of the compressed air actuator, and the limits of a disassembly control slot and cam pin arrangement which is effective in both directions to control the movement of the inner slide relative to the inner housing. During this retraction, the cut end insulation portion is stripped clear of the wire, by the closed cutters which are positioned on the inner slide. The wire is not damaged. Also when the wire is specially coated, the coating also is not damaged. The cut end insulation portion, when stripped clear of the wire, is then ejected clear of this insulated wire stripper by automatically utilizing a downwardly pivotal ejector mounted on the inner slide. This ejector is caused to pivot downwardly, when passing a cam screw depending from the inner housing. When the inner slide is released, its momentum and its continuous pulling by the retracting piston insures its full retraction. At the completion time of the retraction of the inner slide, the piston is also fully retracted in the cylinder of the compressed air actuator. Also at this time, the force holding the gripper together and the force holding the cutter together are simultaneously released. The cam of the coupler at this time is no longer transmitting a force, via the cam of the lever. Therefore, the return spring positioned in the lever, pivotally moves the lever to the horizontal starting position thereof. Via the pin interconnections, this lever movement causes the opening movement of the cutter back to the starting open position thereof. Also during this full return time, while the compressed air pressure is still being applied, there are no forces being applied by the relative positioning of the cam pins to keep the gripper closed. When the retracting air pressure is still turned on, and the gripper and the cutter are freed for opening movement or have so opened, the operator quickly pulls out the stripped end of this previously overall insulated wire, thereby eliminating any possibility of the wire end later becoming mushroomed, upon the return motions of any components of this insulated wire stripper. After completion of this stripping of the insulation from the end of an inserted insulated wire, the operator reverses the air valve to vent the air, via his or her finger manipulation. Then the compression coiled spring of the air actuator, and the compression coiled spring of the wire stripper together effectively return all of the relative moving parts of this overall insulated wire stripper to their starting positions to receive another end of an insulated wire. The operator does not have to have his or her hands used in any squeezing together motion, as formerly undertaken when using most hand held and hand operated plier action type insulated wire strippers. During use of this wire stripper, the operator's hand holds an outer housing, which is secured at one end to the cam pins holding block, which in turn is secured to the back plate. This outer housing extends forwardly to partially receive the inner housing, to complete the assembly of this insulated wire stripper.

BACKGROUND

Although several models of insulated wire stripping machines are available, which rest on a bench or on their own support, to receive ends of an insulated wire to thereafter subsequently and automatically strip the insulation off of the wire conductor to expose a specified length of wire end, there is possibly only one model of a hand held insulated wire stripper, which automatically strips the insulation off of a wire conductor. The insulated wire stripper referred to as a pneumatic wire stripper, requires the concurrent operator's actions of releasing the lever of a compressed air valve, while simultaneously and gently withdrawing the insulated wire, now with the end thereof stripped, from within this pneumatic wire stripper. These necessary concurrent actions, on the part of the operator, prevent the so called mushrooming of the strands of a stripped end conductor.

Most of the hand held insulated wire strippers require the operator to squeeze together his or her fingers to close a plier action type insulated wire stripper.

This is a tiresome daily activity, therefore there is a need for a compact hand held insulated wire stripper to be used more extensively, which will be used without requiring any stressful finger squeezing operations. Instead, the operator's fingers and hand will only be used to support the insulated wire stripper, and to move a control of an automatically operating insulated wire stripper to initiate and to continue a wire stripping function.

SUMMARY

A hand held automatically operated insulated wire stripper is sized for convenient and comfortable holding in one hand of an operator. After his or her other hand and fingers are used to insert a length of an insulated wire through a designated wire size entry to reach an adjustably positioned stop, the operator using a finger on the hand holding this insulated wire stripper moves a control to cause this insulated wire stripper to automatically function to strip the insulation off of the wire without damaging the wire. Also if the wire is coated, the coating is not damaged. While the operator continues to hold the control in the position she or he moved it to cause the stripping action, the operator quickly pulls out the insulated wire, now having the stripped end. There is no possibility of the end of the stripped portion of the wire to be hit by spring returned parts, causing any unwanted mushrooming of a wire end.

This overall insulated wire stripper includes a compressed air actuator, having an internal coiled return spring, and a compressed air control valve. The wire stripping portions also include an internal coiled return spring. At the commencement of a wire stripping operation these coiled return springs, acting together, have all of the components of this hand held compressed air powered wire stripper positioned to receive an end of an insulated wire. After an end of an insulated wire is inserted to contact a preset adjustable position stop by the operator using his or her other hand, then this hand held insulated wire stripper is ready for the commencement of the automatic stripping of the insulation from the wire end without damaging the wire, and without damaging any coating on the wire.

Moving of the compressed air control valve directs compressed air into a cylinder of the compressed air actuator and against a piston therein. A previously extended portion of this piston is thereby partially withdrawn into the cylinder against the force of the coiled compression spring within the cylinder. Also another coiled compression spring surrounding this extended portion of the piston is compressed, upon this withdrawing of a partial length of this initially extending portion of this piston.

The extending end of the extending portion of the piston is indirectly flexibly coupled, to an inner slide of this wire stripper via a cam surfaced portion of a coupler, and cam surfaced portions of a spring returned lever, pivotally mounted on the inner slide. The sliding of this inner slide is directionally controlled by an inner housing which surrounds the inner slide. The insulation cutter assembly, which also strips away the insulation, is mounted at the front of this inner slide. The lower cutter blade portion is non movably held in this inner slide. The upper blade portion is movably held via supporting pins to a lever which is in turn pivotally mounted to he inner slide using a pivot pin or shaft. A return spring acting between this lever and the inner slide keeps the insulation cutter assembly open. When the compressed air is initially turned on, the retracting movement of the extending piston portion, via the flexible coupling and the cam surfaced portions thereof, causes the pivoting of this lever and the movement of the upper blade downwardly to cause the controlled cutting of the insulation.

Before this cutting of the insulation and during this cutting of the insulation, the insulated wire has been gripped upon the closing together of an upper gripper portion and a lower gripper portion. The opening and closing of the insulated wire gripper is directly undertaken upon the relative movement of respective sets of upper and lower cam pins. They are held in place by a cam pin block which is secured to the back plate of the insulated wire stripper. These gripper portions are positioned just inside a front cover of the inner housing, against a shoulder thereof, and this cover has respective entries for respective size wires. The lower gripper portion is held captive between the front cover, the shoulder of the inner housing and the lower cam pins. The upper gripper portion is slidably held captive between the front cover, the shoulder of the inner housing, and the upper cam pins.

During the initial insulated wire gripping period and also during the initial simultaneous cutting of the insulation period, the inner slide is releasibly held captive to the inner housing. Together they move rearwardly for a short distance nearer the cam pin block and the back plate, until the gripper and the cutter are both firmly bearing respectively against the insulated wire and the wire. These firmly bearing positions of the gripper and cutter are reached before a disassembly limit structure could ever become effective. This disassembly limit structure includes a limit structure surrounding a slot in the inner housing contacts a projecting stop screw, which is positioned in the cam pins holding block adjacent the back plate of the wire stripper.

The inner slide is released from the inner housing, when the compressed air pressure increases sufficiently, to overcome the initial positioning force of a leaf spring secured to the inner housing, which initially positions a portion of a transverse control pin in a transverse control pin receiving groove in the inner slide. When the leaf spring force is overcome, the control pin is moved clear of the inner slide and completely into a transverse receiving opening in the inner housing, which initially received a portion of this transverse control pin.

The inner slide, when thereafter independently retracting with the extending portion of the piston, carries the forced together insulation cutter portions so they strip the cut insulation from the wire. The wire is not damaged, nor is any coating on the wire damaged during these cutting and stripping operations.

When the inner slide is released, its momentum and its continuous pulling by the retracting piston insures its full retraction. At the completion time of the retraction of the inner slide, the piston is also fully retracted in the cylinder of the compressed air actuator. Also at this time, the force holding the gripper together and the force holding the cutter together are simultaneously released. The cam of the coupler at this time is no longer transmitting a force, via the cam of the lever. Therefore, the return spring positioned in the lever, pivotally moves the lever to the horizontal starting position thereof. Via the pin interconnections, this lever movement causes the opening movement of the cutter back to the starting open position thereof. Also during this full return time, while the compressed air pressure is still being applied, there are no forces being applied by the relative positioning of the cam pins to keep the gripper closed. When the retracting air pressure is still turned on, and the gripper and the cutter are freed for opening movement or have so opened, the operator quickly pulls out the stripped end of this previously overall insulated wire, thereby eliminating any possibility of the wire end later becoming mushroomed, upon the return motions of any components of this insulated wire stripper.

A downwardly pivoting, self returning, ejector is pivotally mounted on the inner slide. After the insulation is cut and stripped from the wire, this ejector is contacted by a cam screw secured to the inner housing, and caused to pivot to eject the cut insulation clear of this insulated wire stripper.

An outer housing is secured to the cam pin mounting block adjacent the back plate and partially extended over the inner housing. The operator places his or her hand about this outer housing. Also the pressurized air control valve is mounted on this outer housing for convenient manipulation by the person's fingers of his or her holding hand. The person's other hand is used to insert the insulated wire and to withdraw the insulated wire, after the end thereof has had the insulation stripped clear of the wire and this insulated wire stripper. The overall compactness of this hand held compressed air powered insulated wire stripper, and its comparatively lighter weight, and its automatic functioning, insures that this hand tool will be comfortably and efficiently used to carefully strip insulated wires.

Preferably, the front plate entries, the number of the gripper opening portions, and the number of the insulation cutter opening portions, are all multiple in number and aligned parallel to one another, and each sized differently, so an operator may use this insulated wire stripper to strip the insulation off of differently sized insulated wires. The insulated wire grippers and insulation cutters are conveniently removed, and other ones for different insulated wire sizes are conveniently interchanged to meet changing insulated wire size specifications.

DRAWINGS

A preferred embodiment of the hand held compressed air powered insulated wire stripper is illustrated in the drawings, wherein.

Figure 3:
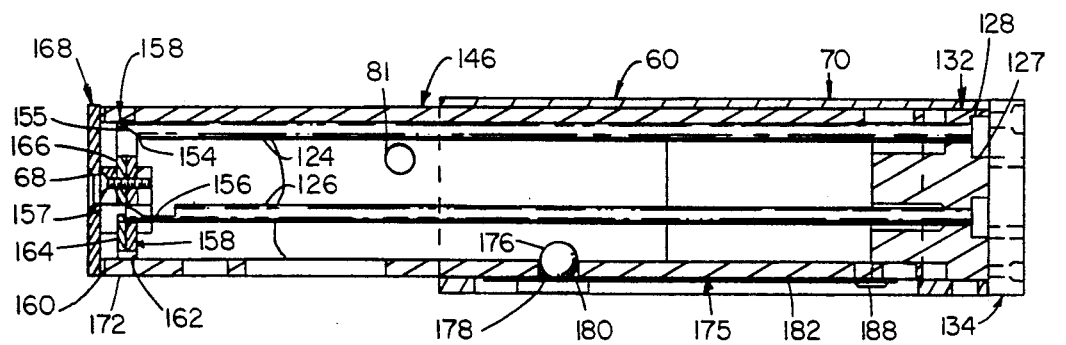
FIG. 3 is a partial vertical sectional view taken in a vertical longitudinal plane located nearer a side of this insulated wire stripper, showing the opened insulated wire gripper subassembly, and the cam pins, before any compressed air is admitted.
Figure 4:
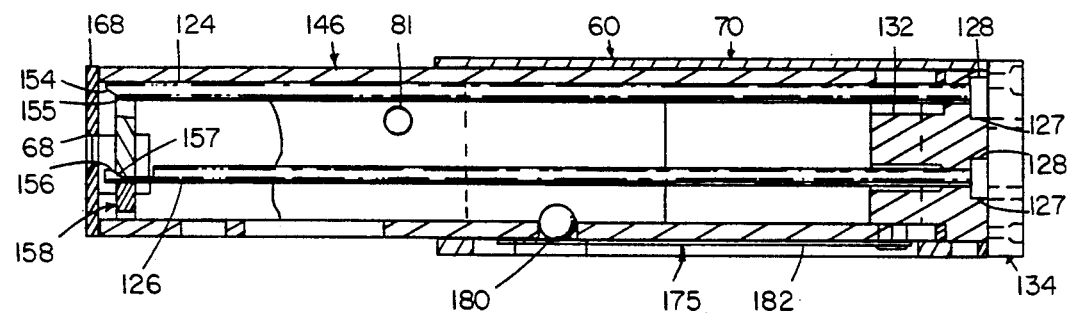
FIG. 4 is a partial vertical sectional view taken in the same vertical longitudinal plane, as shown in FIG. 3 showing the closed insulation wire gripper subassembly, and the cam pins, after the compressed air has been admitted.
Figure 5:
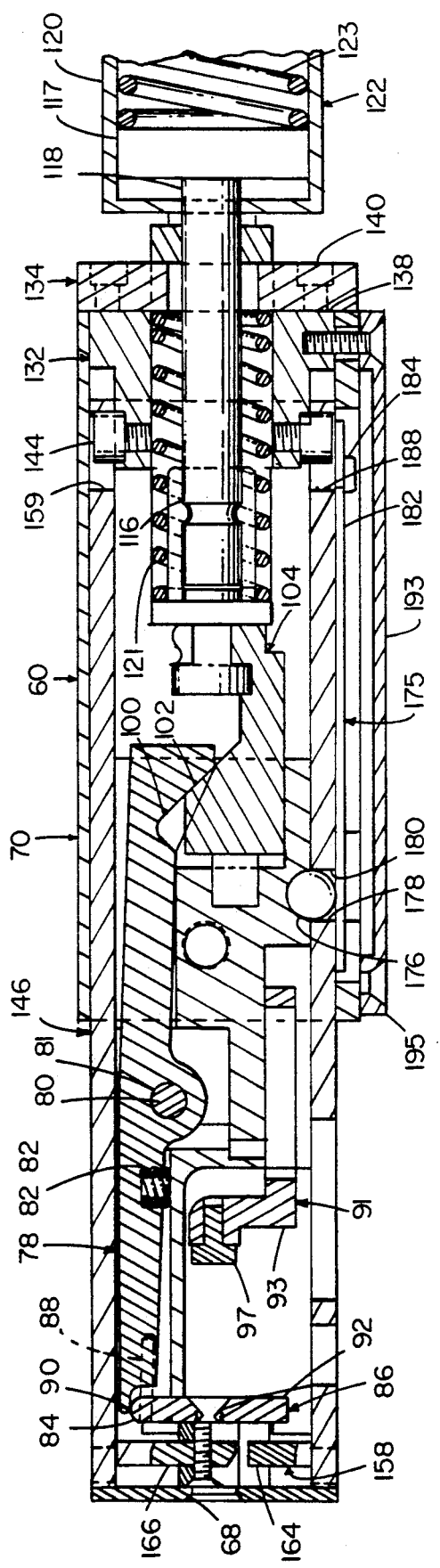
Figure 6:
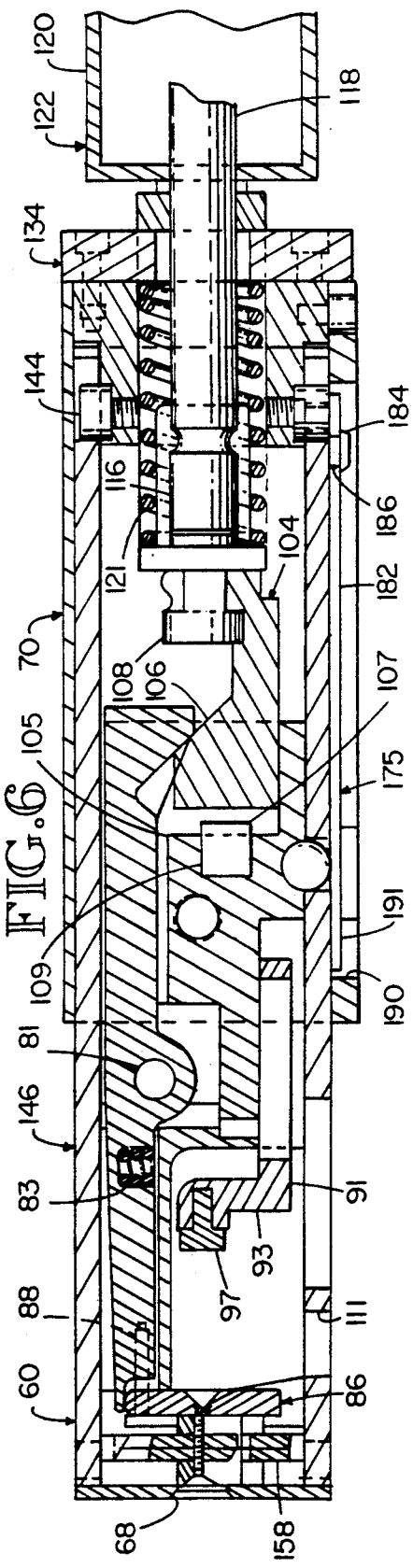
Figure 9:
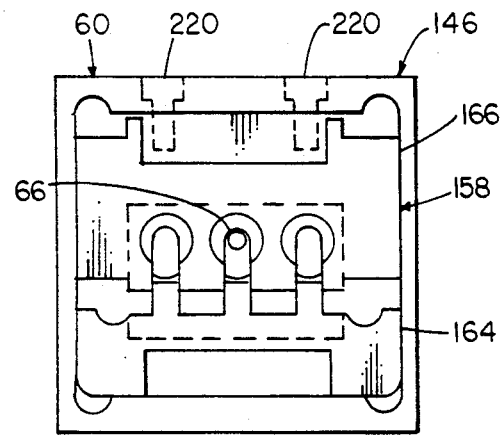
Figure 10:
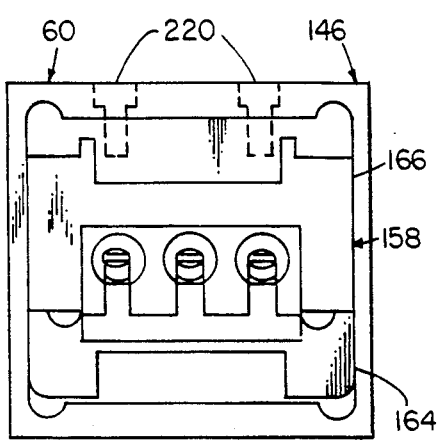
Figure 11:
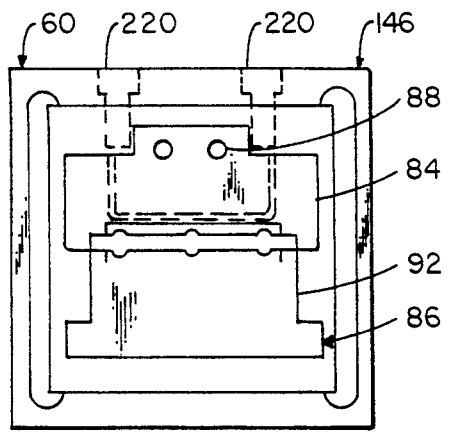
Figure 12:
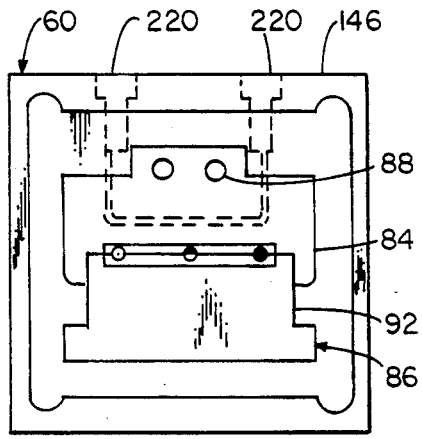

FIG. 5 is a partial vertical sectional view, taken in a vertical longitudinal plane located along the longitudinal centerline of this insulated wire stripper, showing the opened insulated wire gripper subassembly, and the opened insulation cutter subassembly, and also indicating this open position of the lever, which eventually moves the upper insulation cutter; before any compressed air is admitted, and the return springs are all effective in creating this starting arrangement of the gripper subassembly and the insulation cutter subassembly;

FIG. 6 is a partial vertical sectional view, taken in the same vertical longitudinal plane as shown in FIG. 5 showing the closed gripper subassembly, and the closed insulation cutter subassembly, the latter, closed by the operation of the lever, and also showing the inner slide and the inner housing still releasibly held together, as previously shown in FIGS. 3, 4, and 5, and thereby also indicating the inner slide is stopped from retracting any farther within the inner housing, even though the compressed air has been admitted;

FIG. 7 is a partial vertical sectional view, taken in the same vertical longitudinal plane as shown in FIGS. 5 and 6, showing how the released inner slide has moved back within the inner housing, and the closed insulation cutter subassembly has moved to strip the cut insulation from the wire, when the build up of compressed air pressure has exceeded the holding power of a flat spring, originally keeping a transverse locking pin in place;

FIG. 8 is a partial vertical sectional view, taken in a vertical longitudinal plane located very near an inner side of this insulated wire stripper, showing a slide returning motion control slotted structure of the inner housing, made of aluminum, positioning a vertical steel stop rod, to make contact, as necessary, with a steel stop pin threaded into the slide thereby avoiding any possible excessive return motion of the slide, which otherwise could dislodge the gripper subassembly;

FIG. 9 is a near front elevational view of the insulated wire stripper with some portions removed, to show how an end of an insulated wire has been entered into the center one of the three differently sized openings of an opened insulated wire gripper subassembly, having an upper gripper portion and a lower gripper portion before the compressed air has been turned on;

FIG. 10 is a near front elevational view of the insulated wire stripper, with some portions removed, similar to FIG. 9, but showing, however, how the insulated wire gripper subassembly has closed to grip the inserted end of the insulated wire, which has been inserted in centerline located entry, after the compressed air has been turned on;

FIG. 11 is a near front elevational view of the insulated wire stripper, with some portions removed, to show the insulation cutter subassembly in the open position, before the compressed air has been turned on;

FIG. 12 is a near front elevational view of the insulated wire stripper, with some portions removed, to illustrate the insulation cutter subassembly in the closed position, after the compressed air has been turned on, and for clarity, the inserted insulated wire is not shown.

Figure 13:
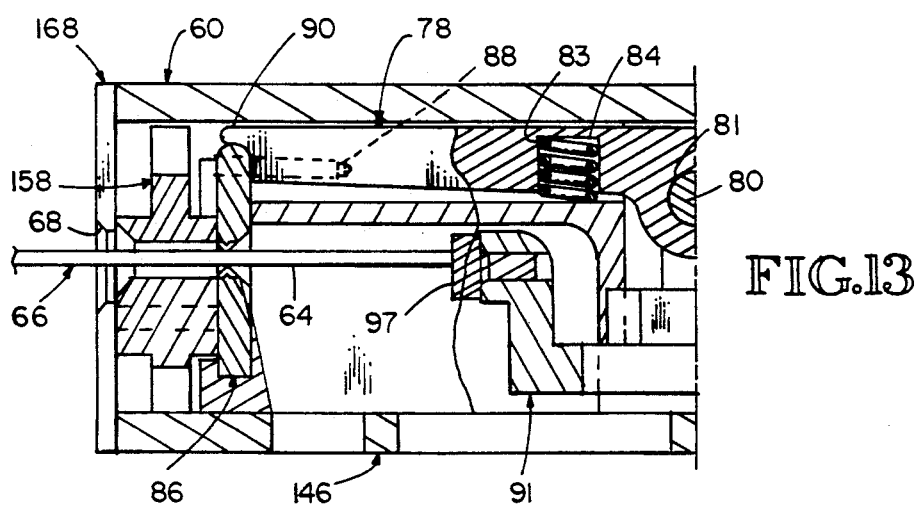
Figure 29:
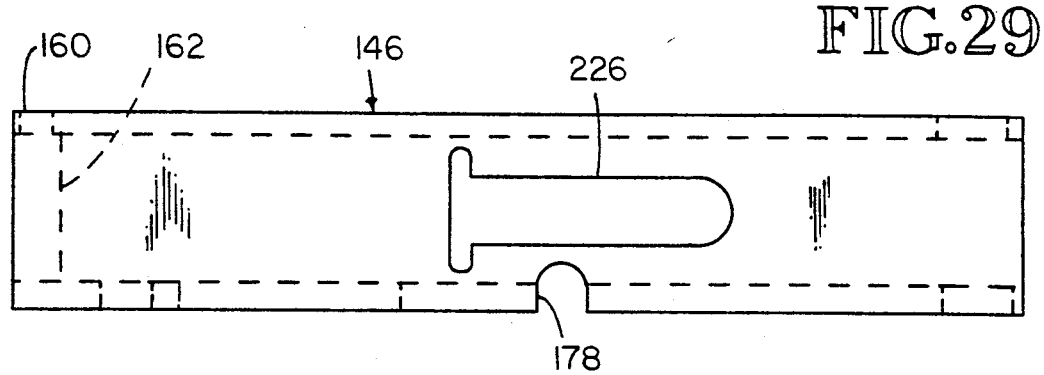
Figure 30:
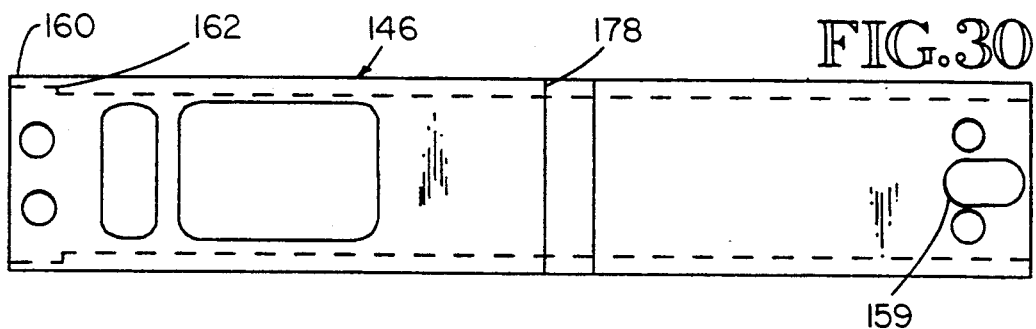
Figure 31:
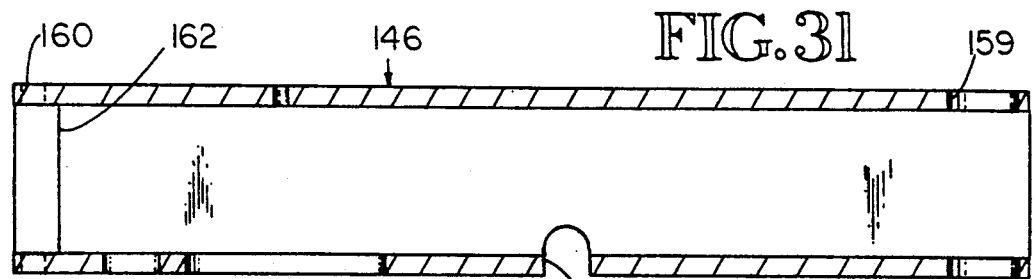
Figure 32:
Figure 33:
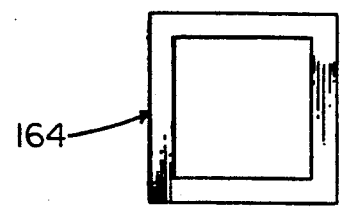
Figure 34:
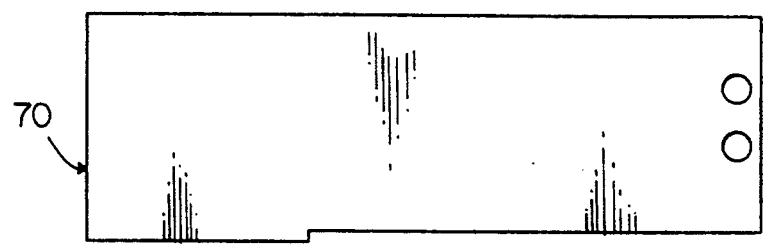
Figure 35:
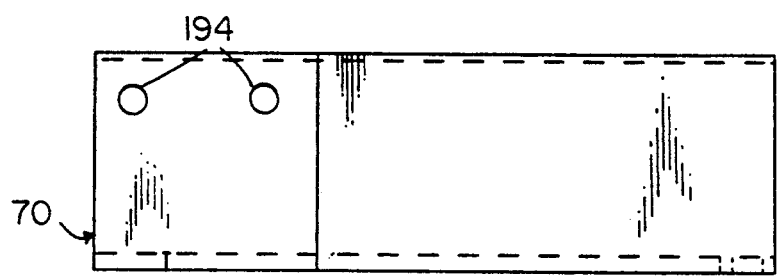
Figure 36:
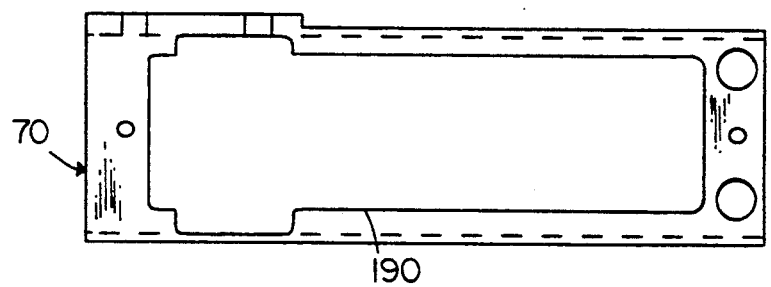
Figure 37:
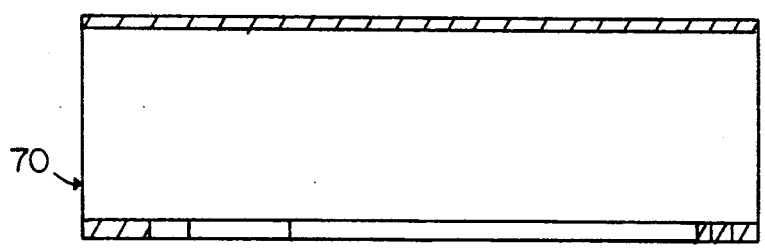
Figure 38:
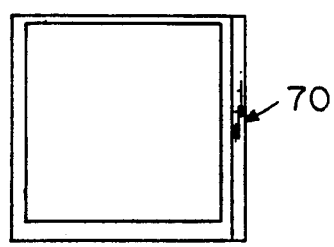
Figure 39:
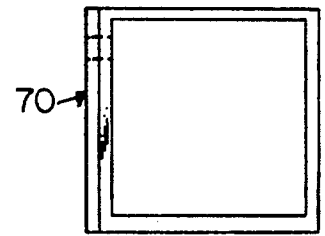
Figure 40:
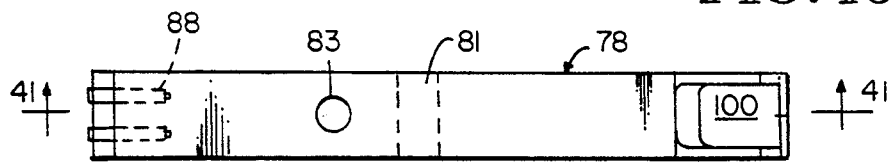
Figure 41:
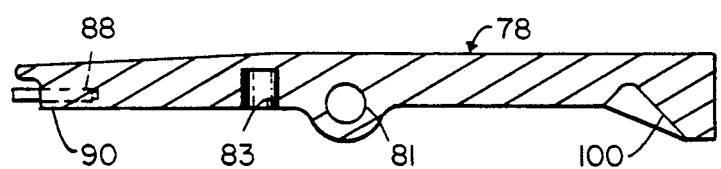
Figure 42:
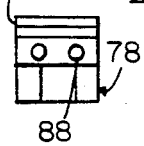
Figure 44:
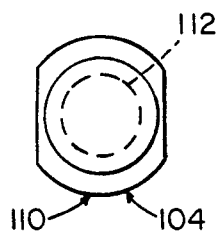
Figure 43:
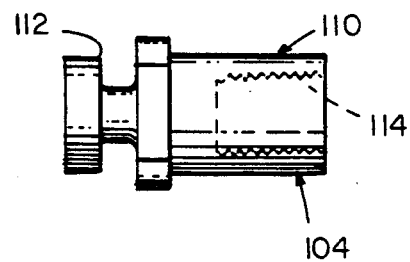
Figure 45:
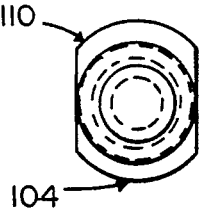

FIG. 13 is a partial vertical sectional view taken along the longitudinal center plane of the insulated wire stripper to show the entry of the end of the insulated wire passed through the opened insulated wire gripper subassembly and beyond through the opened insulation cutter subassembly to contact the adjustable position stop, before the compressed air has been turned on;

FIG. 14 is a partial vertical sectional view, similar to FIG. 13, taken along the longitudinal center plane of the insulated wire stripper, showing how the insulation of the inserted end of the insulated wire has been cut, upon the movement of the lever, in turn moving the upper cutter downwardly, and illustrating also how the insulation ejector, when incorporated into this insulated wire stripper, is positioned to be ready to eject the cut insulation, after the compressed air has been turned on;

FIG. 15 is a partial vertical sectional view, somewhat similar to FIGS. 13 and 14, taken along the longitudinal center plane of the insulated wire stripper, illustrating how he slide has been moved, carrying the insulation cutter subassembly, to strip the insulation from the wire, and also showing how the insulation ejector, has been moved, via the contacts with the cam pins, to eject downwardly the cut and stripped away portion of the insulation, after the compressed air has been turned on long enough to create a force to overcome the releasible locking subassembly of the slide to the inner housing;

FIG. 16 is a partial vertical sectional view taken along the longitudinal plane, nearer the side of the insulated wire stripper, to show how the top and bottom cam pins are positioned, when the insulated wire gripper subassembly is opened to receive an end portion of an insulated wire, before the compressed air is turned on;

FIG. 17 is a partial vertical sectional view, somewhat similar to FIG. 16, taken along the longitudinal plane, nearer the side of the insulated wire stripper, to show how the top and bottom cam pins are positioned, when the insulated wire gripper subassembly is closed to grip an end portion of an insulated wire, after the compressed air is turned on;

FIG. 18 is a front view of the upper cutter of the insulation;

FIG. 19 is a side view of the upper cutter of the insulation;

FIG. 20 is a front view of the lower cutter of the insulation;

FIG. 21 is a side view of the lower cutter of the insulation;

FIG. 22 is a top view of the inner slide;

FIG. 23 is a side view of the inner slide;

FIG. 24 is a bottom view of the inner slide;

FIG. 25 is a vertical sectional view of the inner slide, taken along the center thereof;

FIG. 26 is a front view of the inner slide;

FIG. 27 is a rear view of the inner slide;

FIG. 28 is a top view of the inner housing;

FIG. 29 is a side view of the inner housing;

FIG. 30 is a bottom view of the inner housing;

FIG. 31 is a vertical sectional view of the inner housing, taken in the central portion thereof;

FIG. 32 is a front view of the inner housing;

FIG. 33 is a rear view of the inner housing;

FIG. 34 is a top view of the outer housing;

FIG. 35 is a side view of the outer housing;

FIG. 36 is a bottom view of the outer housing;

FIG. 37 is a vertical sectional view of the outer housing, taken in the central portion thereof;

FIG. 38 is a front view of the outer housing;

FIG. 39 is a rear view of the outer housing;

FIG. 40 is a bottom view of the lever which holds and moves the upper cutter of the insulation cutter subassembly;

FIG. 41 is a sectional view of this lever taken on line 41—41 of FIG. 40;

FIG. 42 is a front view of this lever;

FIG. 43 is a side view of the cam return pin which is to be connected to the extended piston portion of the compressed air cylinder;

FIG. 44 is the front view of this cam return pin;

FIG. 45 is a rear view of this cam return pin;

FIG. 46 is a top view of the slide and lever control cam to be located between the cam return pin and the lever which moves the upper cutter of the insulation cutter subassembly;

FIG. 47 is a side view of this slide and lever control cam;

FIG. 48 is a sectional view of this slide and lever control cam, taken on line 48—48 of FIG. 46;

FIG. 49 is a front view of this slide and lever control cam;

FIG. 50 is a rear view of this slide and lever control cam;

FIG. 51 is a top view of the adjustably positioned insulated wire stop holder;

FIG. 52 is a vertical cross section of the adjustably positioned insulated wire stop holder, taken on section line 52—52 of FIG. 51;

FIG. 53 is a front view of the adjustably positioned insulated wire stop holder;

FIG. 54 is a perspective view, with portions cut away, to illustrate how the insulated wire gripper cam pins at their forward ends interfit with the upper and lower insulated wire grippers, and how these cam pins at their rear ends are formed and are positioned in the cam pin block to prevent their rotation, and also the inserted end of an insulated wire is illustrated.

DESCRIPTION OF THE PREFERRED EMBODIMENT

Figure 1:
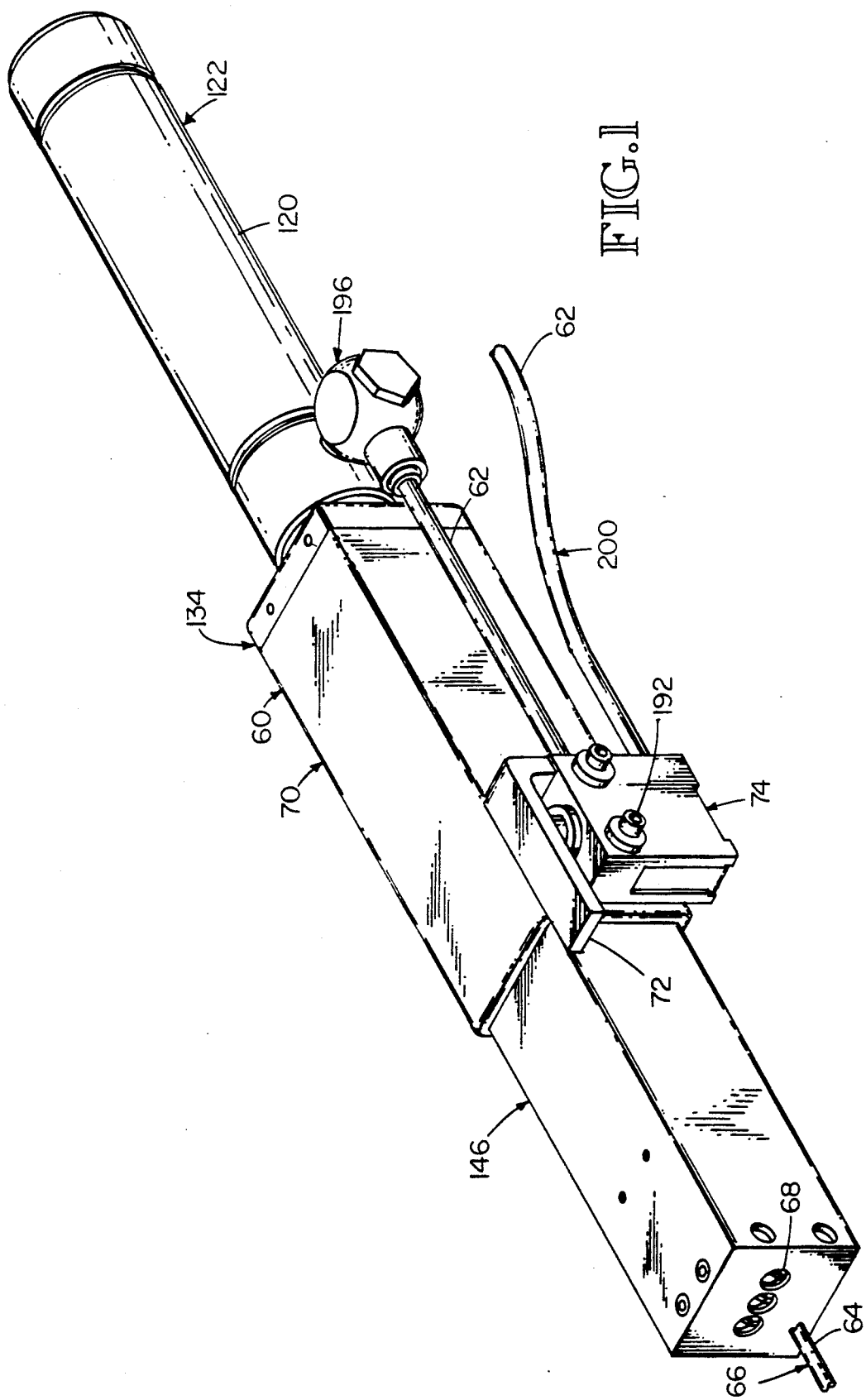
FIG. 1 is a perspective view of this insulated wire stripper, assembled and ready to receive a compressed air supply and then to receive an end of an insulated wire.

A preferred embodiment 60 of this hand held compressed air powered insulated wire stripper 60 is illustrated throughout the figures of the drawings. In FIG. 1 this embodiment 60 is shown assembled ready to be connected to a source of compressed air, not shown, via a compressed airline 62, and ready to receive an end 64 of an insulated wire 66. Multiple insulated wire entries 68 are utilized of different sizes to receive respectively differently sized insulated wires 66, such as the three entries 68 illustrated in FIG. 1.

The operator will place one of his or her hands about the outer housing 70 of this insulated wire stripper 60, in a convenient position, so a finger of this hand will be conveniently used to actuate the depressible lever 72 on a compressed air valve 74, which is secured to this outer housing 70. The operator will use his or her other hand to conveniently and quickly move the end 64 of an insulated wire 66 through an entry 68, into and out of this hand held compressed air powered insulated wire stripper 60. The operator's efforts are limited to these less tiring holding, lever moving, and wire guiding, movements, than those movements undertaken, when using hand powered wire strippers.

Figure 2:
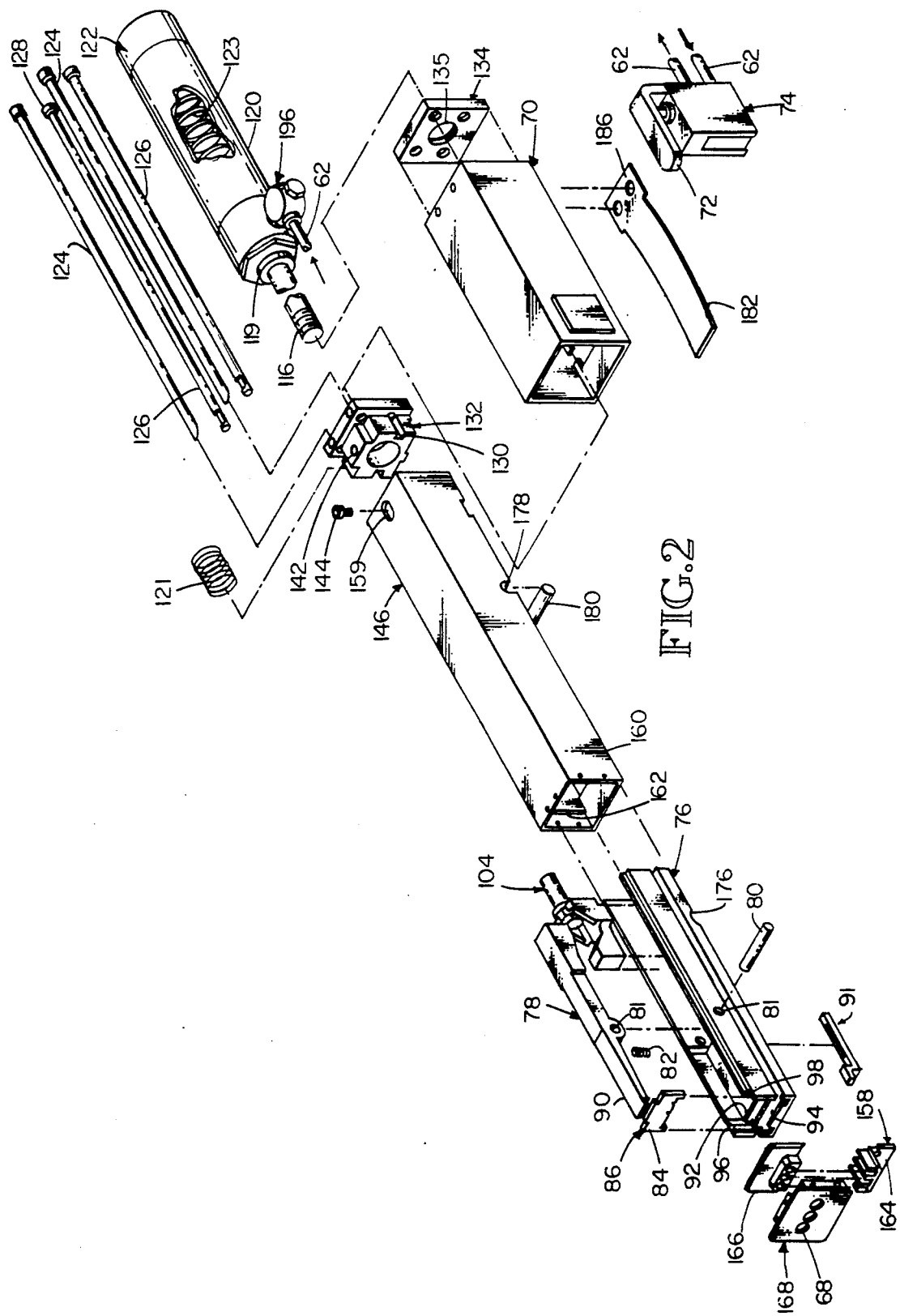
FIG. 2 is a perspective exploded view of most of the parts of the insulated wire stripper.

In FIG. 2, essentially all of the components of this hand held compressed air powered insulated wire stripper 60 are illustrated spaced apart, with guide lines indicating their subsequent assembly movements with respect to one another. How these components are related to one another, after assembly, in respect to illustrated longitudinal sections thereof, is illustrated in FIGS. 1 through 7.

The Assembling of the Inner Slide, Cutter Actuator Lever, and Cutter Subassembly, etc.

As shown in FIGS. 2 and 5, an inner slide 76 receives a cutter actuator lever 78, via a mounting pin 80 and positioning holes 81. Between this lever 78 and inner slide 76, a return force coiled spring 82 is positioned in hole 83 in this lever 78 to keep this lever 78 in a horizontal position. When so positioned, the upper cutter portion 84 of the cutter subassembly 86 is held in its opened raised position, via the connecting pins 88, used in securing this upper cutter portion 84 to the operating end 90 of this lever 78.

As shown in FIGS. 2 and 5, the lower cutter portion 92 is positioned for non movement in a front receiving groove 94 of the inner slide 76. Also there are guiding grooves 96, 98, in the front of the inner slide 76, to guide the up and down, or opening and closing, movements of the upper cutter portion 84, upon the movements of the cutter actuator lever 78. These cutter portions 84 and 92 are illustrated in FIGS. 18 through 21.

As shown in FIGS. 7, 14, and 15, the length of the insulation 65 to be removed from an insulated wire 66 to expose the wire 67 per a specified length is adjustably preselected by mounting a wire stop subassembly 91 on the inner slide 76, below the forward portions of the cutter actuator lever 78. This subassembly 91 has a plastic body 93, which is secured by fasteners 95 to the inner slide 76, an<which positions a metal stop screw 97 to receive the inserted end 64 of an insulated wire 66.

After this wire stop assembly 91 has been installed on the inner slide 76, and subsequently, when the inner slide 76 has been inserted within inner housing 146, then later, when wire stop adjustments are to be made, they are undertaken, after removing a cover plate, not shown, which has been placed over an access opening 101 in the inner housing, using threaded fasteners, not shown, and threaded holes 111 in the inner housing 146.

As shown in FIGS. 2, 5, 41, 43, and 47 the cutter actuator lever 78 has a downwardly facing cam surfaced end structure 100 for interacting with an upwardly facing cam surfaced coupling structure 102 of a two piece flexible coupler assembly 104. One piece 106 of these two pieces, has the cam structure 102 and a collar receiver 108. The other piece 110 has a collar end 112 to be movably received in the collar receiver 108, and an internally threaded end 114 for threaded attachment to the threaded extending piston rod end 116 of a piston rod 118, which moves a piston 117 within a cylinder 120 of a compressed air actuator 122.

Another return force coiled spring 121, is placed about this threaded extending piston rod end 116 to eventually be confined between the coupling structure 102 and the front of the compressed air actuator 122. This spring 121 and yet another return coiled spring 123, positioned within the cylinder 120 of the compressed air actuator 122, together axially and longitudinally move back, to their starting positions, the many axially or longitudinally moving components of this insulated wire stripper 60, after an insulation stripping procedure has been completed.

As shown in FIGS. 5, 6, 7, 14, and 15, during either the insulated wire stripping motions or during the return motions, any contact between the one piece 106 of the flexible coupler assembly 104 and the rear end 105 of the inner slide 76, is cushioned by using a resilient shock absorber 107 extending outwardly and rearwardly from a receiving recess 109 on this rear end 105 of the inner slide 76. During this assembling of the inner slide 76, cutter actuator lever 78, cutter subassembly 86, etc., the installation of a positive action stripped insulation ejector subassembly 206 is often and preferably undertaken, as later described.

The Assembling of the Gripper Closing and Opening Cam Pins, the Gripper Cam Pins Retaining Block, and the Back End Plate As illustrated in FIGS. 2, 3, 4, and 54, there are four gripper cam pins extending from the front of this hand held compressed air powered insulated wire stripper 60 to the front locale of the compressed air actuator 122. There are two alike and spaced above, which are called the gripper closing cam pins 124. Then there are two alike and spaced below, which are called the gripper opening cam pins 126. They all have like pin head back ends 128, each having a flat side 129 to contact a transverse positioning bar 129 to keep them from turning, which are positioned in four alike gripper cam pin receiving recesses 130, arranged about a gripper cam pin receiving block 132. Thereafter a back end plate 134 is secured to this gripper cam pin receiving block 132 to hold in place the pin head back ends 128 of all of the four gripper cam pins 124, 126.

As shown in FIGS. 5 and 54, this gripper cam pin receiving block 132 has a central opening 136 to slidably receive the threaded extending rod end 116 of the piston rod 118. Both this gripper cam pin receiving block 132 and the back end plate 134 have threaded fastener receiving holes 138 to receive fasteners 140, which are used to secure them together. In addition the gripper cam pin receiving block 132 has a threaded hole 142 to receive a retaining pin 144, used in keeping the inner housing 146 controllably and slidably positioned relative to this gripper cam pin receiving block 132. Also this receiving block 132 has threaded holes 148 to receive fasteners, not shown, used in securing the outer housing 70 to this receiving block 132.

The two gripper closing cam pins 124, positioned above, have forward cam ends 154 arranged on a bias. The two opening cam pins 126, positioned below, have forward cam ends 156 arranged as a slot with one forward slot side arranged on a bias. The cammed ends serve in controlling the closing and opening movements of the gripper subassembly 158. There are cooperating cam surfaces 155, 157 on the upper gripper portion 166.

The Assembling of the Previously Assembled Gripper Closing and Opening Cam Pins, the Gripper Cam Pin Retaining Block, and the Back End Plate, With the Compressed Air Actuator, and Also Assembling the Two Piece Flexible Coupler Assembly With the Threaded Extending Piston End of the Piston of the Compressed Air Actuator At this stage of the overall assembly of this hand held compressed air powered insulated wire stripper 60, the back end plate 134, via a central threaded hole 135 thereof, is threaded on to a threaded central front fitting 119 on the cylinder 120 of the compressed air actuator 122. Also the two piece flexible coupler assembly 104, via the internally threaded end 114 of its other piece 110, is threaded on the threaded extending piston end 116 of the piston 118 of the compressed air actuator 122. These interconnections serve to complete the joining of the compressed air actuator 122 to the wire stripping components of this hand held compressed air powered insulated wire stripper 60.

The Assembling of the Previous Assemblies Centering on the Assembly of the Previously Assembled Inner Slide, Cutter Actuator Lever and Cutter etc., and the Previously Assembled Gripper Closing and Opening Cam Pins, the Gripper Cam Pin Returning Block and the Back End Plate, etc. by Using the Inner Housing, etc.

After assembling the inner slide 76, the cutter actuator lever 78, and cutter subassembly 86, etc., and after assembling the gripper closing and opening cam pins 124, 126, the gripper cam pin retaining block 132, and the back end plate 134, etc. and securing portions of each respectively to the compressed air actuator, these respective assemblies are fitted together. Subsequently, the inner housing 146 is slidably placed over these assembled earlier assemblies. Then the retaining pin 144 is passed, in part, through the relative travel limiting motion slot structure 159 of this inner housing 146, and secured to the gripper cam pin retaining block 132, to retain them together, while also keeping the gripper cam pins 124, 126, well positioned within this inner housing 146.

Assembling of the Gripper Subassembly and the Front Plate Having Multiple Insulated Wire Entries As illustrated in FIGS. 2, 3, 4, 13, 14, 15, and 54, just inside the front end 160 of the inner housing 146 is a front shoulder 162 to position the insulated wire gripper subassembly 158. The bottom or lower insulated wire gripper portion 164 remains in position inside the inner housing 146 near the bottom the cams 155, 157 thereof, is moved up to open and move down to close this gripper subassembly 158, upon the respective interactions of the forward cammed ends 154 of the two upper gripper closing cam pins 124, and the forward cammed ends 156 of the lower gripper opening cam pins 126, during the relative motions between the inner housing 146 holding the gripper subassembly 158, and these gripper cam pins 124, 126, secured to the gripper cam pin receiving block 132.

After the placement of the gripper subassembly 158 in the front end 160 of the inner housing 146, a front plate 168, having multiple insulated wire entries 68, to respectively receive and guide insulated wires of different sizes, is secured to the front end 160 of the inner housing 146, using fasteners 170 passing through holes 172 in the inner housing 146 and into threaded holes 174 in the front plate 168.

Assembling the Outer Housing in Conjunction With Assembling the Releasible Override Stop Subassembly Which Initially Keeps the Inner Slide Connected to the Inner Housing At this subsequent stage of assembling this hand held compressed air powered insulated wire stripper 60, a releasible override stop subassembly 175 is installed during a period both before and after the placement of the outer housing 70, which will extend over a portion of the inner housing 146.

As illustrated in FIGS. 2 through 8, the bottom sides and bottom of both the inner slide 76 and the inner housing 146 have respective transverse partial receiving slots 176, 178 which are aligned, when these components 76 and 146 are initially positioned to receive the inserted end 64 of an insulated wire 66. When these slots 176, 178 are aligned, and the outer housing has been installed and secured to the gripper cam pin retaining block 132 by using fasteners, not shown, inserted into the threaded holes 148, a transverse control pin 180 is placed in these partial transverse receiving slots 176, 178.

This placement of the transverse control pin 180 is initially maintained by a cantilevered flat spring 182 secured at one end thereof, to the bottom of the inner housing 146, by using threaded fasteners 184 passing, in part, through holes 186 in this spring 182 and into threaded holes 188 in the inner housing 146. The bottom of the outer housing 70 has a cut out portion 190 to accommodate the insertion of the transverse control pin 180 and the secure placement of the cantilevered flat spring 182, and the relative movement of this spring 182 within this cut out portion 190, during the relative movement of the inner housing 146 within the outer housing 70. This cut out portion 190 is covered by cover 193, which is secured by fasteners 195.

During the released functional period of this releasible override stop subassembly 175, which commences after the gripping and cutting of the inserted end 64 of the insulated wire, and which continues on through the stripping of the insulation 65 from the wire 67, the free end 191 of this cantilevered flat spring 182 deflects sufficiently to allow the transverse control pin 180 to completely drop clear of the transverse partial receiving slot 176 of the inner slide 76, while remaining, in part, in the transverse partial receiving slot 178 of the inner housing 146, as illustrated in FIGS. 6 and 7.

Assembly of Compressed Air Control Valve and Operating Lever Thereof and Compressed Airlines A compressed air control valve 74 having a finger depressible lever 72 is secured to the outer housing 70 by using fasteners 192 threaded into threaded holes 194 of the outer housing 70 as shown in FIGS. 1 and 35. A compressed airline 62 extends between this control valve 74 and a source of compressed air, not shown, which will be located in the factory area or other area, where this insulated wire stripper 60 will be used. Another compressed airline 62 extends between this control valve 74 and the compressed air inlet port structure 196 on the cylinder 120 of the compressed air actuator 122. There is a discharge or exhaust air port, not shown, on the opposite end of the cylinder 120 to complete the overall compressed air system 200.

The operation of this overall compressed air system 200 commences after the insertion of an end 64 of an insulated wire 66 to contact the wire stop assembly 91, and the finger movement of the control lever 72 of the compressed air control valve 74. This operation then continues during the gripping of the insulated wire 66, the cutting of the insulation 65, the stripping of the insulation 65 from the wire 67, and the removal of the insulated wire 66, with the then stripped end 64 thereof, from this hand held compressed air powered insulated wire stripper 60.

Thereafter, upon the reverse movement of the control lever 72, the two coiled springs 121, 123 arranged axially and longitudinally, respectively, about the extending end 116 of the piston rod 118, and within the cylinder 120 of the compressed air actuator 122, become very effective to return the moving components of this insulated wire stripper 60 back to their starting positions, as the compressed air is exhausted via a port, not shown, in the compressed air control valve 74. Before and during this return time, the return force coiled spring 82 has returned the cutter actuator lever 78 to the starting position thereof, raising the upper cutter portion 84 of the cutter subassembly 86. Also before and during this return time, the gripper cam pins 124, 126 have accommodated the raising of the upper or top gripper portion 166 of the gripper subassembly 158. Moreover, during this return time, as the transverse partial receiving slots 176, 178, respectively, of the inner slide 76 and the inner housing 146 are again aligned, the cantilevered flat spring 182 effectively moves the transverse control pin 180, to be partially inserted in each of these transverse partial receiving slots 176, 178.

Utilization of a Positive Action Stripped Insulation Ejector

Although gravity is often effective in causing a piece 204 of stripped insulation 65, sometimes referred to as a slug 204, to drop out of this hand held compressed air powered insulated wire stripper 60, the incorporation of a positive action stripped insulation ejector subassembly 206 is undertaken, as shown in FIGS. 14 and 15. A cantilevered ejector 208, formed from a spring wire material 210, is secured at one back end thereof to the inner slide 76, by inserting a bent end, having two downwardly bent spaced legs, not shown, into snap in receiving holes, not shown, of the inner slide 76. A depending end 216 of this cantilevered ejector 208 is downwardly passable through an opening, not shown, in the inner slide 76. Depending and projecting ejector cam screws 220 are threadably inserted down through threaded holes 222 in the inner housing 146, to contact the cantilevered ejector 208 during the extended retracting movement of the inner slide 76 relative to the inner housing 146, after the release of the releasible override stop assembly 175 has occurred. At the conclusion of this relative movement, the depending end 216 of the cantilevered ejector 208 has been quickly and sufficiently lowered to contact and to forcibly eject the piece 204, or slug 204, of stripped insulation 65 completely out of this hand held compressed air powered insulated wire stripper 60.

When this positive action stripped insulation subassembly is installed, the installation is undertaken, commencing when the assembling is undertaken of the inner slide 76, cutter actuator lever 78, and cutter subassembly 86. After this assembling is completed and the inner housing 146 has been placed over the inner slide 76, the ejector cam screws 220 will be positioned in the inner housing 146.

How the Insulated Wire Gripping, Cutting, and Stripping Components Move After the Time an Insulated Wire End Has Been Inserted and the Compressed Air valve Has Been Opened As shown in FIG. 1, an insulated wire end 64 of an insulated wire 66 is being directed into a selectable insulated wire entry 68. After passing through a selected insulated wire size entry 68, the insulated wire 66 is advanced, until the inserted end 64 thereof contacts the metal stop screw 97 of the wire stop assembly 91, as shown in FIG. 14. At this commencing time, there is no compressed air being utilized, and all the return springs 82, 121, and 123, have effectively positioned all the movable components into their initial positions.

As illustrated in FIGS. 3, 5, and 16, the gripper subassembly 158 has been opened, as the two gripper opening cam pins 126, via their forward cammed ends 156, have raised the top or upper gripper portion 166, sufficiently above the stationary bottom or lower gripper portion 164, to provide adequate clearance for the passing of the end 64 of the insulated wire 66. The forward cammed ends 154 of the two gripper closing cam pins have accommodated this opening of the gripper subassembly 158, upon the spring biased full return of both the inner housing 146 and the inner slide 76 to their respective starting positions.

At this time the upper cutter portion 84 of the cutter subassembly 86 is being held in the raised position thereof, above the lower cutter portion 92, by the cutter actuator lever 78, as shown in FIG. 5. This insertion of the end 64 of the insulated wire 66 is quickly undertaken at all times, even if the wire is not straight, because the entry 68, the gripper opening, and the cutter opening are designed to conveniently receive an insulated wire end 64 which is partially curved and/or partially irregularly curved.

The length of the inserted portion of the insulated wire 66 is comparatively kept quite limited by the placement of both the gripper subassembly 158, and the cutter subassembly 86 very near the insulated wire entry 68, which is flush with the front this insulated wire stripper 60. When the various single insulated wires 66 of a bundle are separated out to be individually stripped, the separated length of each single wire is comparatively kept short, because of this excellent forward placement of the gripper subassembly 158 and the cutter subassembly 86.

When the man or woman using this hand held compressed air powered insulated wire stripper 60 has assured himself or herself that the wire end 64 has contacted the wire stop assembly 91, then he or she depresses the lever 72 of the compressed air control valve 74, and the force created moves the piston 117 back through the interior of the cylinder 120 of the compressed air actuator 122, against the force of the two return springs 123 and 121. At the outset of this overall return movement of the many respective retractable components, the inner slide 76 and inner housing 146 are secured together by a transverse control pin 180. They move together relative to the two gripper closing cam pins 124 and the two gripper opening cam pins 126 which are held stationary in the gripper cam pins receiving block 132. During this initial relative movement their respective forward cammed ends 154, 154 cooperate, as shown in FIGS. 16 and 17, to move the top or upper gripper portion 166 of the gripper subassembly 158, via the cams 155 thereof, into firm contact with the insulated wire 66, which in turn is moved into firm contact with the lower or bottom gripper portion 164, as illustrated in FIG. 16.

Also during this initial return time, when the inner slide 76 and the inner housing 146 are secured together by a transverse control pin 180, the cutter actuator lever 78 is caused to pivot, against the force of the return spring 82, to move the upper wire 66, which in turn is moved down against the lower cutter portion 92. The relative motion between these upper cutter and lower cutter portions 84, 92 is limited by their design, as illustrated in FIGS. 18 through 21, so only the insulation 65 will be cut, as shown in FIG. 15, and the wire 67, often coated, will not be scraped, nicked, nor scratched.

The cutter actuator lever 78 is caused to pivot as the down facing cam surface 100 thereof, is contacted by the upward facing cam surface 102 of the one piece 106 of the two piece flexible coupler assembly 104, during the retractable movement thereof. The other piece 110 of this coupler assembly 104 is threaded to piston rod 118, which is integral with the piston 117, being moved inside the compressed air actuator 122, under the force of the compressed air.

This quick sequence, being essentially instantaneous, of the insulated wire 66 being gripped, and the insulation being cut is completed, when the inner slide 76 remains in place with respect to the inner housing 146, via the positioning of the transverse control pin 180. Then very soon thereafter, the releasible override stop subassembly 175, via the build up of the overall compressed air pressure, is overridden. The pulling force reaching the inner slide 76 becomes great enough, so the inner slide 76 moves, causing the transverse control pin 180 to be moved out of the transverse partial receiving slot 176 of the inner slide 76, against the retaining force created by the cantilevered flat spring 182, as illustrated in FIG. 7. This pulling force reaches the inner slide 76, via the piston 117, piston rod 118, the coupler assembly 104, and the cutter actuator lever 78.

The insulation 65 is quickly removed from the wire 67. Then the momentum of the inner slide 76 causes the inner slide 76 to partially overtake the retracting motion of the coupler assembly 104, as shown in FIG. 7. Then at this time, the relative positions of the respective cam 100 on the inner slide and the cam 102 on the coupler assembly 104, make it possible for the operator to withdraw the insulated wire 66 from this insulated wire stripper 60, while the compressed air control valve 74 is still opened, as the lever 72 is still being depressed.

Following the stripping of the insulation, the insulation ejector subassembly 206 is effective in ejecting piece or slug 204 of insulation 65 from within this insulated wire stripper, as illustrated in FIG. 15.

When the insulated wire 66 has been withdrawn, with the end 64 then stripped, the operator moves his or her finger clear of the lever 72 of the compressed air control valve 74. Thereafter, the axial and longitudinally directed forces of the springs 121 and 123 serve to return the moving components to their starting spaces. These springs 121 and 123 are timely and sequentially assisted by the force of the spring 82 pivoting the cutter actuator lever, to continue the opening of the cutter subassembly 86, and by the force of the cantilevered flat spring 182 returning the transverse control pin 180 into the locking position thereof, between the inner slide 76 and the inner housing 146. When the inner housing 146 returns to the starting position thereof, the relative positioning of the gripper subassembly 158, carried by the inner housing 146, with respect to the respective forward cam ends 154, 156 of the respective two gripper closing cam pins 124, and the two gripper opening cam pins 126, completes the opening of the gripper subassembly 158, previously commenced upon the withdrawal of the insulated wire 66.

When compressed air enters the front end of the compressed air cylinder 120 of the compressed air actuator 122, the piston 117 is forced toward the rear of the cylinder 120. The piston rod 118 of this actuator 122, via the coupling 104, applies a force on the cutter actuator lever 78. This lever 78, via a mounting pin 80, is connected to the inner slide 76. Therefore this force is also trying to move the inner slide 76 toward the rear of this insulated wire stripper.

However, at this starting time, the inner slide 76 is temporarily locked, with a transverse control locking pin 180 to the inner housing 146, and therefore the inner slide 76 cannot move backward independently. At this starting time, since the inner slide 76 is unable to move backward, the force being applied to the cutter actuator lever 78, causes the lever 78 to pivot and to thereby close the cutter subassembly 86, and at this moment cut the insulation 65.

After the insulation 65 is cut, the insulation 65 can only be removed from the wire 67, when the insulated wire 66 is held firmly in the gripper subassembly 158, and the inner slide 76 moves, independently of the inner housing 146, toward the rear, while the insulation cutter subassembly 86 remains closed.

Regarding the closing of the insulation gripper subassembly 158, the inner housing 146 is always loosely connected to the gripper cam pins receiving or holding block 132, via the retaining pin 144 confined within the relative travel limiting motion slot structure 159. This loose connection permits this cam pin holding block 132 and the compressed air cylinder 120, which is connected to this cam pin holding block 132, to move together. In one embodiment of this wire stripper 60, this movement extends for three sixteenths of an inch inside the inner housing 146.

This relative motion, or floating motion, of three sixteenths of an inch, also permits the like relative motion of the assembled cam pins holding block 132 and cam pins 124, 126, within the inner housing 146. During this relative motion or floating motion, the gripper subassembly 158 is actuated. The cam portions 154 and 156 on the respective cam pins 124 and 126 interacting with the cam portions 155, 157 on the upper gripper portion 166 will actuate the gripper subassembly 158. When the assembly of cam pins 124, 126 and the cam pin receiving block 132 moves relatively deeper into the inner housing 146, the gripper subassembly 158 is closed to grip the insulated wire 66. Conversely, when this assembly of the cam pins 124, 126 and the receiving block 132 moves relatively back in the inner housing 146, the gripper subassembly 158 is opened to release the insulated wire 66. This movement in either direction, in one embodiment, is confined within a length of three sixteenths of an inch within the inner housing 146.

When the compressed air pressure is applied, after the insertion of the end 64 of the insulated wire 66, then during the starting moments, the inner slide 76 and inner housing 146 are locked together, via the releasible override stop assembly 175 having the transverse control pin 180 in the locking position thereof. As a consequence, then these locked together inner slide 76 and inner housing 146 are kept from moving backward. Yet the air actuator 122 connected to the back end plate 134, in turn connected to the cam pin holding block 132, in turn connected to the cam pins 124, 126, as an assembly, in effect, moves forwardly to cause the closing of the gripper subassembly 158.

Essentially simultaneously, when this gripper subassembly 158 is being closed during this three sixteenths of an inch relative or floating movement, the piston 117 is trying to move to the rear during this three sixteenths of an inch relative or floating movement. But because of holding power of the releasible override stop assembly 175, at this initial operating time, the piston 117, via the extending rod portion 116, and the two piece flexible coupler assembly 104, is only able to pivot the lever 76 to cause the wanted simultaneous closing of the cutter subassembly 86 to cut the insulation 65.

After this simultaneous gripping of the insulated wire 66, and the simultaneous cutting of the insulation 65, the larger force created during the following increased air pressure operating period, eventually overcomes the holding power of the releasible override stop assembly 175, originally holding the inner slide 76 inside the inner housing 146, whereby the inner slide 76 is pulled back upon the power of the compressed air actuator 122. During this preliminary movement of the released inner slide 76, the cutter subassembly remains closed and the insulation 75 is stripped from the wire 67, while the insulated wire 66 remains tightly held in the gripper subassembly 158. The stripped away insulation 204 is cleared from this insulated wire stripper 60, upon the operation of the insulation ejector subassembly 206.

At the end of the rearward motion of the piston 117, the inner slide 76, via the limited longitudinal freedom provided by the two piece flexible coupler assembly 104, is able, via its momentum, to move back farther a small distance. When this occurs, the return force spring 82 positioned in the cutter actuator lever 78 raises the front operating end 90 of this lever 78 to open the cutter subassembly 86.

Also at this operational momentum time, there is no force being applied, via the cam pins 124, 126, to keep the gripper subassembly 158 closed, therefore the operator of this insulated wire stripper 60, easily pulls on the insulated wire 66, to clear the finished stripped wire 67 from within this stripper 60. This clearing of the stripped wire 67 is undertaken before the compressed air control valve 74 is operated to stop the supply of compressed air and open the vent, and consequently also before the inner slide 76 returns to the starting position.

After the stripped wire 67 is removed, and after the lever 72 on the compressed air control valve 74 is released, the force of the spring 123 inside the cylinder 120 of the compressed air actuator 122, and the force of the additional spring 121 positioned about the extended end 116 of the piston rod 118, combine to cause the return of the inner slide 76 to the starting position thereof. Upon reaching this starting position, the inner slide is again locked to the inner housing 146 by the releasible override stop assembly 176.

To avoid any possibility of an overrun by the returning inner slide 76, a steel cam stop pin 224, during assembly of this insulated wire stripper 60, is passed through a slide returning motion control slotted structure 226 of the inner housing 146, made of aluminum, and positioning a vertical steel stop rod 228. Then this stop pin 224 is threaded into place in the inner slide 76, as shown in FIG. 8. As necessary, on the return of the inner slide 76, the steel cam stop pin 224 will contact the vertical steel stop rod 228, at the forward end of the slotted structure 226, to control the inner slide returning motion, thereby avoiding possible excessive return motion of the inner slide 76, which otherwise could dislodge the gripper subassembly 158.

At this return time to the starting position of the inner slide 76, the cam pins 124, 126 have opened the gripper subassembly 158. Also, the cutter actuator lever 68 has opened the cutter subassembly 86, and the insulated wire stripper 60 is ready to receive another end 64 of an insulated wire 66 to have a piece 204 of insulation 65 stripped from the wire 67.

The overall compactness of this hand held compressed air powered insulated wire stripper 60, and its comparatively lighter weight, and its automatic functioning, eliminating the need for hand squeezing motions, insures that this hand held tool 60 will be comfortably and efficiently used to carefully strip insulated wires 66.

I claim:

1. A hand held compressed air powered insulated wire stripper, comprising:
  a) a hollow inner housing having:
     i) a front end to receive a front plate and having threaded holes to receive fasteners;
     ii) a front shoulder to position an insulated wire gripper subassembly;
     iii) a bottom transverse control pin partial receiving slot;
     iv) a guiding and retaining pin limit elongated slot;
     v) bottom threaded openings to receive fasteners to hold a cantilevered flat spring;
     vi) a bottom access opening to provide access to adjust wire stop subassemblies;
     vii) a return motion control limit elongated slot to receive a cam stop pin;
  b) an open top inner slide for sliding movement within the hollow inner housing, having:
     i) bearing like holes to position a transverse mounting pin, which in turn will position a cutter actuator lever within the open top of this inner slide;
     ii) a bottom receiving structure to receive both adjustably positioned insulated wire end stops and fasteners to be used to secure these end stops to this receiving structure;
     iii) a front transverse receiving channel to receive and to position a lower insulation cutter of an insulation cutter subassembly;
     iv) opposite side vertical receiving channels to receive and to guide an upper insulation cutter of an insulation cutter subassembly;
     v) a top positioning surface to contact a lower portion of a cutter actuator lever return spring;
     vi) a bottom transverse control pin partial receiving slot;
     vii) a top accessible rear receiving volume to receive a two piece flexible coupler assembly;
     viii) a centered longitudinal rear facing hole having an inserted resilient shock absorber; and
     ix) a threaded hole to receive a guiding and stop pin; and
  c) a cutter actuator lever for positioning in the open top of the open top inner slide, having:
     i) a transverse bearing like hole to receive a transverse mounting pin, which in turn will position this cutter actuator lever within the open top of this inner slide;
     ii) front end pin receiving holes to receive connecting pins to be used in holding an upper insulation cutter;

iii) a bottom recess for positioning a return force coiled spring;
iv) a rear end depending cam for contacting a cam on a two piece flexible coupler assembly;

d) a cutter actuator lever return force coiled spring for placement in the bottom recess of the cutter actuator lever, and to bear against the top positioning surface of the open top inner slide;

e) a transverse mounting pin to pivotally position the cutter actuator lever on the open top inner slide using the bearing like holes on the open top inner slide and the transverse bearing like hole in the cutter actuator lever;

f) connecting pins placed in the front end pin receiving holes of the cutter actuator lever to receive the upper insulation cutter;

g) a two piece flexible coupler assembly for slidable placement into the open top inner slide, having:
  i) one piece, at the front, having in turn a front cam for sliding contact with the rear end depending cam of the cutter actuator lever, having a top opening collar receiving structure, for the purpose to position a front collar, which is formed as spaced dual flanges on the other piece at the back; and
  ii) the other piece, at the back, having the front collar, formed as front spaced dual flanges to interfit with the top opening collar receiving structure of the one piece at the front, and having an internally threaded longitudinal rear opening to be threaded over a threaded end of an extending portion of a piston of a compressed air cylinder of a compressed air actuator;

h) an extending portion of a piston rod of a piston of a compressed air actuator having external threads for threaded securement into the internally threaded rear opening of the other piece at the back of the two piece flexible coupler assembly;

i) a compressed air actuator having:
  i) a compressed air cylinder;
  ii) air in and air out openings;
  iii) a piston;
  iv) a piston rod having the extending portion;
  v) compression coiled return spring;
  vi) a projecting externally threaded portion to threadably receive a rear internally threaded portion of a back plate of this insulated wire stripper;

j) a back plate of this insulated wire stripper having:
  i) a rear internally threaded portion to receive the projecting externally threaded portion of the compressed air actuator; and
  ii) fastener receiving holes to secure a cam pin block to this back plate;

k) a compression coiled return spring of this insulated wire stripper slidably placed about the extending portion of the piston rod between the two piece flexible coupler assembly and the back plate;

l) four elongated cam pins for operating an insulated wire gripper subassembly having;
  i) rear captive flanges, each having a partial flat portion thereof, on all of said elongated cam pins;
  ii) front depending depressing cam surfaces on two of these elongated cam pins arranged above to contact and to move downwardly an upper insulated wire gripper, via cam surfaces thereof, of an insulated wire gripper assembly;
  iii) clearing cam surfaces on two of these elongated cam pins arranged below to contact and to receive an upper insulated wire gripper of an insulated wire gripper assembly;

m) a cam pin block, to receive and to hold the four elongated cam pins utilizing their rear captive flanges having:
  i) longitudinal captive holes to receive the passed through cam pins, as the rear captive flanges thereof are retained in these longitudinal captive holes;
  ii) transversely positioned threaded holes to receive threaded fasteners to hold an outer housing in place;
  iii) another transversely positioned threaded hole to receive a retaining pin, which will prevent the disassembly of the inner housing from this cam pin block; and
  iv) threaded holes to receive threaded fasteners for securing this cam pin block to the back plate, after the cam pins have been passed through and captured in the cam pin block;

n) fasteners to secure the cam pin block to the back plate;

o) adjustable positioned insulated wire end stops for placement in the bottom receiving structure of the open top inner slide;

p) fasteners to secure the adjustable positioned wire end stops to the open top inner slide;

q) an insulation cutter subassembly, having:
  i) a lower insulation cutter positioned in the front transverse receiving channel of the open top inner slide, and having at least one insulated wire receiving and cutting portion; and
  ii) an upper insulation cutter secured to the front end of the cutter actuator lever by using the connecting pins thereof, and also slidably positioned in the opposite side vertical receiving channels of the open top inner slide, and having at least one insulated wire receiving and cutting portion;

r) an insulated wire gripper subassembly having:
  i) a lower insulated wire gripper positioned in the hollow inner housing against the front shoulder and below the clearing cam surfaces of the two lower cam pins, and having at least one insulated wire receiving and gripping portion; and
  ii) an upper insulated wire gripper positioned in the hollow inner housing against the front shoulder and having respective cam surfaces to interact directly with the respective depending depressing cam surfaces and clearing cam surfaces of the respective four elongated cam pins, and having at least one insulated wire receiving and gripping portion;

s) a front plate having:
  i) threaded holes to receive fasteners;
  ii) at least one pre-sized entry portion to receive and to guide a particular sized insulated wire end for subsequent stripping of the insulation thereof;

t) fasteners to secure the front plate to the inner housing;

u) a guiding and retaining pin passed partially through the guiding and retaining pin limit elongated slot of the hollow inner housing and threaded into the cam pin block to prevent the dissembly of the hollow inner housing from the cam pin block;

v) a cam stop pin passed partially through the return motion control limit elongated slot on the hollow inner housing and threaded into the threaded hole in the open top inner slide to serve in guiding and stopping the return motion of the open top inner slide relative to the hollow inner housing, preventing any contact with the gripper subassembly;

w) a releasible override stop subassembly serving to keep the open top inner slide in a commencing position within the hollow inner housing during the gripping of an insulated wire end and the cutting of the insulation of this insulated wire end, having:

i) transverse control pin initially partially inserted into the bottom transverse control pin partial receiving slot of the open top inner slide, and at the same time partially inserted into the bottom transverse control pin partial receiving slot of the hollow inner housing;

ii) a cantilevered flat spring secured at the rear end thereof to the hollow inner housing via holes thereof to receive fasteners;

iii) threaded fasteners to secure the cantilevered flat spring via the cantilevered flat spring holes and the bottom threaded openings of the hollow inner housing, to position the cantilevered flat spring free end against the transverse control pin, thereby keeping the transverse control pin partially into the partial receiving slots of both the open top inner slide and the hollow inner housing, until after the insulation has been cut, and until the compressed air pressure build up moves the compressed air actuator to overcome the restraining force of the cantilevered flat spring, moving the transverse control pin out of the partial receiving slot of the open top inner slide, freeing this slide and the carried insulation cutter subassembly for additional travel within the hollow inner housing to thereby strip the cutaway insulation from the inserted wire end;

x) an outer housing having:

i) holes to receive fasteners which secure this housing to the cam pin block;

ii) a bottom opening to accommodate the movement of the cantilevered flat spring;

iii) having threaded holes to receive fasteners which secure a finger manipulated control valve for a compressed air line;

y) threaded fasteners to secure the outer housing to the cam pin block;

z) a finger manipulated control valve for a compressed air line, positioned on the outer housing;

a') threaded fasteners to secure the finger manipulated control valve to the outer housing; and b') compressed air lines to direct compressed air from a compressed air source to this finger manipulated control valve and beyond to the compressed air actuator.

2. A hand held compressed air powered insulated wire stripper, as claimed in claim 1, comprising, in addition, an insulation ejector subassembly to eject the cut and stripped insulation from the interior of this insulated wire stripper, having:

a) receiving structure on the open top inner slide to receive portions of this insulation ejector subassembly;

b) a cam screw opening on the hollow inner housing;

c) a cam follower cantilevered ejector placed in the receiving structure on the open top inner slide; and d) a cam screw secured in the cam screw opening on the hollow inner housing to bear against the cam follower cantilevered ejector, causing the downward movement thereof to contact and to eject the cut and stripped insulation from the interior of this insulated wire stripper, when the inner slide carrying this cam follower cantilevered ejector is being pulled back within the inner housing.

3. A hand held compressed air powered insulated wire stripper, as claimed in claims 1 or 2, comprising, in addition, multiple sets of related components arranged adjacent one another, whereby this insulated wire stripper is used to cut and to strip insulation off of insulated wires of different sizes, the said multiple sets of related components comprising:

a) multiple pre-sized entry portions of the front plate;

b) multiple pre-sized insulated wire receiving and gripping portions of the lower insulated wire gripper;

c) multiple pre-sized insulated wire receiving and gripping portions of the upper insulated wire gripper;

d) multiple pre-sized insulated wire receiving and cutting portions of the lower insulation cutter;

e) multiple pre-sized insulated wire receiving and cutting portions of the upper insulation cutter; and f) multiple adjustable positioned insulated wire end stops.

4. A hand held compressed air powered insulated wire stripper, as claimed in claims 1 or 2, comprising in addition, a cover attachment to the outer housing to cover the cut out portion of the outer housing which accommodates the cantilevered flat spring.

5. A hand held compressed air powered insulated wire stripper, comprising:

a) a hollow outer housing;

b) a hollow inner housing, which slides inside the said hollow outer housing;

c) an open top inner slide for sliding movement within the hollow inner housing;

d) a cutter actuated lever pivotally positioned on the open top inner slide;

e) an insulation cutter subassembly mounted on both the open top inner slide and the cutter actuator lever for cutting action upon movement of the cutter actuator lever;

f) an insulated wire gripping subassembly mounted on the hollow inner housing to grip an end of insulated wire during the cutting of the insulation thereof;

g) a back place subassembly secured to said hollow outer housing and to be secured to a cylinder of a compressed air actuator;

h) an extended portion of a piston, adapted for securement to a piston of a compressed air actuator, positioned and guided by the back plate assembly;

i) a compression coiled return spring placed about the extended portion of a piston to tend to keep this extended portion extended out from a compressed air actuator;

j) a two piece flexible coupler assembly means for interconnecting the extended portion of the piston and the cutter actuator lever at the rear portion thereof, for subsequently moving the insulation cutter subassembly via the action of the lever arm, to cut the insulation off of an end of an insulated wire, upon the initiation of a retracting movement of the extended portion of the piston, and upon the continued retracting movement of the extended portion of the piston, to thereafter retractably move both the cutter actuator lever, while remaining in the position to keep the cutter subassembly in the cutting position, and the open top inner slide, as a subassembly, relative to the hollow inner housing, to thereby strip the cut insulation off of an end of the originally insulated wire end, while the insulated wire gripping subassembly mounted on the hollow inner housing continues to grip this inserted end of the insulated wire;

k) a positioning cam subassembly means extending from the back plate subassembly to the insulated wire gripping subassembly on the hollow inner housing, to actuate the insulated wire gripping subassembly to grip an inserted end of insulated wire, upon the initiation of a retracting movement of the extended portion of the piston, and to continue the gripping during the entire stripping movement; and l) a releasible override stop subassembly means to keep the open top inner slide in a commencing position within the hollow inner housing during the gripping of an insulated wire end and the cutting of the insulation of this insulated wire end, and then to be overridden during the stripping of the insulation from the wire.

6. A hand held compressed air powered insulated wire stripper, as claimed in claim 5, having, in addition, a compressed air line valve subassembly secured to the hollow outer housing for finger manipulation.

7. A hand held compressed air powered insulated wire stripper, as claimed in claim 6, having a compressed air actuator secured to the back plate subassembly and to the extended portion of the piston, and interconnected to the compressed air line valve subassembly.

8. A hand held compressed air powered insulated wire stripper, as claimed in claims 5, 6, or 7, having, in addition, an insulation ejector subassembly mounted between the hollow inner housing and the open top inner slide, and actuated, upon their relative movement, to thereby eject the stripped insulation from within this hand held compressed air powered insulated wire stripper.

9. A hand held compressed air powered insulated wire stripper, as claimed in claims 5, 6, or 7, comprising, in addition, a cam stop pin subassembly operable between the inner slide and the inner housing to stop the return of the inner slide within the inner housing, preventing any overrun that otherwise could dislodge the gripper subassembly.

10. A hand held compressed air powered insulated wire stripper, as claimed in claims 5, 6, or 7, comprising, in addition, a retaining pin subassembly operable between the inner housing and the back plate subassembly, preventing any unwanted disassembly of the inner housing from the back plate subassembly.

11. A hand held compressed air powered insulated wire stripper, as claimed in claim 9, having, in addition, an insulation ejector subassembly mounted between the hollow inner housing and the open top inner slide, and actuated, upon their relative movement, to thereby eject the stripped insulation from within this hand held compressed air powered insulation wire stripper.

12. A hand held compressed air powered insulated wire stripper, as claimed in claim 8, having, in addition, a cam stop pin subassembly operable between the inner slide and the inner housing to stop the return of the inner slide within the inner housing, preventing any overrun that otherwise could dislodge the gripper subassembly.

13. A hand held compressed air powered insulation wire stripper, as claimed in claim 11, having, in addition, a retaining pin subassembly operable between the inner housing and the back plate subassembly, preventing any unwanted disassembly of the inner housing from the back plate subassembly.

14. A hand held compressed air powered insulated wire stripper, comprising:

a) a hollow outer housing;

b) a hollow inner housing, which slides inside this said hollow outer housing;

c) an open top inner slide for sliding movement within the hollow inner housing;

d) a cutter actuated lever pivotally positioned on the open top inner slide;

e) an insulation cutter subassembly mounted on both the open top inner slide and the cutter actuated lever for cutting action upon movement of the cutter actuator lever;

f) an insulated wire gripping subassembly mounted on the hollow inner housing to grip an end of insulated wire during the cutting of the insulation thereof;

g) a back plate subassembly secured to said hollow outer housing and to be secured to a cylinder of a compressed air actuator;

h) an extended portion of a piston, adapted for securement to a piston of a compressed air actuator, positioned and guided by the back plate assembly;

i) a two piece flexible coupler assembly means for interconnecting the extended portion of the piston and the cutter actuator lever at the rear portion thereof, for subsequently moving the insulation cutter subassembly via the action of the lever arm, to cut the insulation off of an end of an insulated wire, upon the initiation of a retracting movement of the extended portion of the piston, and upon the continued retracting movement of the extended portion of the piston, to thereafter retractably move both the cutter actuator lever, while remaining in the position to keep the cutter subassembly in the cutting position, and the open top inner slide, as a subassembly, relative to the hollow inner housing, to thereby strip the cut insulation off of an end of the originally insulated wire end, while the insulated wire gripping subassembly mounted on the hollow inner housing continues to grip this inserted end of the insulated wire;

j) a positioning cam subassembly means extending from the back plate subassembly to the insulated wire gripping subassembly on the hollow inner housing, to actuate the insulated wire gripping subassembly to grip an inserted end of insulated wire, upon the initiation of a retracting movement of the extended portion of the piston, and to continue the gripping during the entire stripping movement; and k) a releasible override stop subassembly means to keep the open top inner slide in a commencing position within the hollow inner housing during the gripping of an insulated wire end and the cutting of the insulation of this insulated wire end, and then to be overridden during the stripping of the insulation from the wire.

15. A hand held compressed air powered insulated wire stripper, as claimed in claims 5 or 14, having in addition a compressed air actuator, having a cylinder thereof secured to the back plate subassembly, and a piston thereof secured to the extended portion of a piston.

16. A hand held compressed air powered insulated wire stripper, as claimed in claims 5 or 14, having in addition, a compressed air actuator, having a cylinder thereof secured to the back plate subassembly, and a piston thereof secure to the extended portion of a piston, and a return spring thereof of sufficient strength to return the piston thereof and all moving components of this insulated wire stripper to the initial insulated wire end receiving positions thereof.

17. A hand held compressed air powered insulation wire stripper, as claimed in claim 14 having, in addition, a retaining pin subassembly operable between the inner housing and the back plate subassembly, preventing any unwanted disassembly of the inner housing from the back plate subassembly.

* * * * *